United States Patent
Prasse

(10) Patent No.: US 8,399,575 B2
(45) Date of Patent: Mar. 19, 2013

(54) CROSSLINKABLE MATERIALS BASED ON ORGANOSILICON COMPOUNDS

(75) Inventor: Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/229,911

(22) Filed: Sep. 12, 2011

(65) Prior Publication Data

US 2012/0004364 A1    Jan. 5, 2012

Related U.S. Application Data

(63) Continuation of application No. 12/203,172, filed on Sep. 3, 2008, now abandoned.

(30) Foreign Application Priority Data

Sep. 3, 2007 (DE) .......... 10 2007 041 856

(51) Int. Cl.
*C08L 83/16* (2006.01)

(52) U.S. Cl. .......... 525/477; 525/474; 525/475; 528/21; 528/22; 528/23; 528/34

(58) Field of Classification Search .......... 525/474, 525/475, 477; 528/10–43
See application file for complete search history.

(56) References Cited

U.S. PATENT DOCUMENTS

| | | | |
|---|---|---|---|
| 2,883,366 A | 4/1959 | Kantor et al. | |
| 3,132,167 A | 5/1964 | Boot et al. | |
| 3,175,995 A | 3/1965 | Elliott et al. | |
| 4,605,446 A | 8/1986 | Isozaki | |
| 5,212,274 A | 5/1993 | Tsukuno | |
| 5,302,683 A | 4/1994 | Weidner et al. | |
| 5,654,374 A | 8/1997 | Arren et al. | |
| 6,184,330 B1 | 2/2001 | Currie et al. | |
| 6,268,440 B1 | 7/2001 | Kudo et al. | |
| 6,521,699 B2 | 2/2003 | Feder et al. | |
| 6,753,399 B2 | 6/2004 | Inokuchi | |
| 7,060,760 B2 | 6/2006 | Schindler et al. | |
| 7,094,859 B2 | 8/2006 | Schindler et al. | |
| 7,723,426 B2 | 5/2010 | Cai et al. | |
| 2003/0009058 A1 | 1/2003 | Canos et al. | |
| 2004/0087752 A1 | 5/2004 | Schindler et al. | |
| 2005/0101753 A1 | 5/2005 | Schindler et al. | |
| 2005/0244659 A1 | 11/2005 | Higuchi et al. | |
| 2006/0111505 A1 | 5/2006 | Schindler et al. | |
| 2006/0205887 A1 | 9/2006 | Nakagawa et al. | |
| 2007/0161768 A1* | 7/2007 | Odaka et al. .......... 528/25 |
| 2007/0167598 A1 | 7/2007 | Stanjek et al. | |
| 2008/0188624 A1 | 8/2008 | Yano et al. | |
| 2009/0165913 A1 | 7/2009 | Hergenrother et al. | |

FOREIGN PATENT DOCUMENTS

| | | |
|---|---|---|
| CN | 1816577 A | 8/2006 |
| EP | 0 538 881 B1 | 4/1997 |
| EP | 1 024 170 A1 | 8/2000 |
| EP | 1 370 602 B1 | 8/2004 |
| EP | 1 550 700 A1 | 7/2005 |
| EP | 1 659 155 A1 | 5/2006 |
| EP | 1 529 071 B1 | 6/2006 |
| EP | 1 624 027 A1 | 6/2006 |
| EP | 1 731 573 A1 | 12/2006 |
| EP | 1 734 079 A1 | 12/2006 |
| EP | 1 832 626 A1 | 9/2007 |
| EP | 1 942 153 A1 | 7/2008 |
| JP | 2006052353 A2 | 2/2006 |
| JP | 2007131799 A2 | 5/2007 |
| WO | 2004022618 A1 | 3/2004 |
| WO | 2005003201 A2 | 1/2005 |
| WO | 2005003201 A3 | 1/2005 |
| WO | 2005097907 A1 | 10/2005 |
| WO | 2006070637 A1 | 7/2006 |
| WO | 2006133677 A1 | 12/2006 |
| WO | 2007040101 A1 | 4/2007 |
| WO | 2007085605 A1 | 8/2007 |
| WO | 2007085620 A1 | 8/2007 |

* cited by examiner

*Primary Examiner* — Randy Gulakowski
*Assistant Examiner* — Mike M Dollinger
(74) *Attorney, Agent, or Firm* — Brooks Kushman P.C.

(57) ABSTRACT

The invention relates to materials which are based on organosilicon compounds, are storable with exclusion of water and are crosslinkable to elastomers on ingress of water at room temperature, which comprise organic acids and basic nitrogen or basic phosphorus, to processes for preparation thereof and to moldings produced therefrom.

18 Claims, No Drawings

CROSSLINKABLE MATERIALS BASED ON ORGANOSILICON COMPOUNDS

CROSS-REFERENCE TO RELATED APPLICATION

This application is a continuation of and claims priority to U.S. application Ser. No. 12/203,172 filed Sep. 3, 2008 and claims priority to German Application No. 10 2007 041 856.8, filed Sep. 3, 2007.

BACKGROUND OF THE INVENTION

1. Field of the Invention

The invention relates to materials which are based on organosilicon compounds, are storable with exclusion of water and are crosslinkable to elastomers on ingress of water at room temperature, which comprise organic acids and basic nitrogen or basic phosphorus, to processes for preparation thereof, and to moldings produced therefrom.

2. Background Art

One-component sealants which are storable with exclusion of water and vulcanize to elastomers on ingress of water at room temperature are known. These moisture curable products are used in large amounts, for example, in the construction industry. These mixtures are based on polymers which are terminated by silyl groups which bear reactive substituents such as OH groups or hydrolyzable groups, for example alkoxy groups. Typically, such materials comprise curing catalysts, especially tin compounds. The labeling requirements for dibutyltin compounds are becoming much more severe, which is causing a demand for replacement of tin compounds in general.

EP-B 538 881 describes materials which comprise organic acids and amines as curing catalysts. In addition, EP-B1 529 071 describes materials which comprise silyl radicals attached to the polymer matrix via N—C bonds. EP-A 1 550 700, EP-A 1 624 027 and EP-A 1 659 155 describe materials which comprise organic acids and amines as curing catalysts. However, the reactivity of these materials is not particularly high.

EP-A 1 734 079 describes materials which comprise organic acids and amines as curing catalysts. However, a significant molar excess of basic nitrogen-containing compounds in relation to the organic acid is employed, in order to catalyze the relatively unreactive gamma-propylsilyl groups at the polymer ends.

WO-A 2007085620 and WO-A 200785605 describe materials which comprise organic anhydrides and amines as curing catalysts. However, the amino groups here are also in a molar excess, and tin catalysts are added.

SUMMARY OF THE INVENTION

An object of the invention is to provide moisture curable compositions which do not require a tin catalyst, yet which exhibit rapid crosslinking, particularly under ambient conditions. These and other objects are achieved by compositions containing a base compound which contains an alkoxysilylmethyl group bonded to an x-valent organic radical via nitrogen, phosphorus, oxygen, sulfur, or a carbonyl group, a basic nitrogen or basic phosphorous compound, a phosphorus-containing acid or carboxylic acid, and a hydrolyzable methylsilyl group bonded to a monovalent organic radical via nitrogen, phosphorus, oxygen, sulfur, or a carbonyl group.

DETAILED DESCRIPTION OF THE PREFERRED EMBODIMENT(S)

The invention thus provides crosslinkable materials comprising (A) at least one compound of the formula $$A\text{-}[CR^1{}_2\text{—}SiR_a(OR^2)_{3-a}]_x \qquad (I)$$

where
A is an x-valent organic radical bonded via nitrogen, phosphorus, oxygen, sulfur or a carbonyl group,
R may be the same or different and is a monovalent, optionally substituted hydrocarbon radical,
$R^1$ may be the same or different and is a hydrogen atom or a monovalent, optionally substituted hydrocarbon radical,
$R^2$ may be the same or different and is a monovalent, optionally substituted hydrocarbon radical,
x is an integer from 1 to 10, preferably 1, 2 or 3, more preferably 1 or 2, and
a is 0, 1 or 2, preferably 0 or 1,
(B) at least one compound which contain at least one basic element of main group 5, selected from the group consisting of
(B1) compounds comprising basic nitrogen and
(B2) compounds comprising basic phosphorus,
(C) at least one acid selected from the group consisting of
(C1) phosphorus acids of the formula $$O\!=\!PR^{20}{}_q(OH)_r(OR^{21})_{3-q-r} \qquad (III)$$

and/or condensates thereof with one or more P—O—P bonds and
(C2) carboxylic acids of the formula $$HOC(\!=\!O)R^{22} \qquad (IV),$$

where
$R^{20}$ may be the same or different and is an optionally substituted hydrocarbon radical which may be interrupted by oxygen atoms,
$R^{21}$ may be the same or different and is a hydrogen atom or an optionally substituted hydrocarbon radical which may be interrupted by oxygen atoms,
$R^{22}$ may be the same or different and is an optionally substituted hydrocarbon radical which may be interrupted by oxygen atoms,
q is 0, 1 or 2,
r is 1, 2 or 3 and
q+r is 1, 2 or 3, and
(D) at least one silane of the general formula $$X\text{—}CR^{1'}{}_2\text{—}SiR'_bY_{3-b} \qquad (II)$$

and/or partial hydrolyzates thereof, where
X is a monovalent organic radical bonded via nitrogen, phosphorus, oxygen, sulfur or a carbonyl group,
$R^{1'}$ may be the same or different and is as defined for $R^1$,
R' may be the same or different and is as defined for R,
Y may be the same or different and is a hydrolyzable radical and
b is 0, 1 or 2, wherein silane (D) is different from compound (A).

Preferably, the compounds (A) of the formula (I) have a molecular weight of from 2000 g/mol to 100,000 g/mol, more preferably from 5000 g/mol to 50,000 g/mol, in each case specified as the number average molecular weight.

Preferably, the mixture of components (B), (C) and (D) has a pH of less than or equal to 7, more preferably from 4 to 7, and especially from 5 to 7.

Preferably, the R radicals are optionally substituted, monovalent hydrocarbon radicals having from 1 to 18 carbon atoms, more preferably alkyl radicals, the vinyl radical, the 3,3,3-trifluoroprop-1-yl radical and the phenyl radical, especially the methyl radical.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl and the 2-propenyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, and the α- and the β-phenylethyl radicals.

Examples of substituted R radicals are haloalkyl radicals, such as the 3,3,3-trifluoro-n-propyl radical, the 2,2,2',2',2',2'-hexafluoroisopropyl radical and the heptafluoroisopropyl radical, haloaryl radicals such as the o-, m- and p-chlorophenyl radical, and the 2-methoxyethyl radical, the 2-methoxypropyl radical and the 2-(2-methoxyethoxy)ethyl radical.

Examples of $R^1$ radicals are a hydrogen atom, the radicals specified for R, and organic polymer radicals, for example those which, as the polymer chain, contain polyoxyalkylene moieties such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprene; polyurethanes; polyesters; polyamides; polyacrylates; polymethacrylates; vinyl polymers; and polycarbonates. Preferably, the $R^1$ radical is a hydrogen atom or a hydrocarbon radical having from 1 to 20 carbon atoms, especially a hydrogen atom.

The A radicals may be an organic polymer radical, or else the X radicals described below. When A is an organic polymer radical, the $R^1$ radical is preferably a hydrogen atom or a hydrocarbon radical having from 1 to 20 carbon atoms. When A has one of the definitions specified below for X, at least one $R^1$ radical is an organic polymer radical.

The A radicals are preferably organic polymer radicals which, as the polymer chain, contain polyoxyalkylenes such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprene; polyurethanes; polyesters; polyamides; polyacrylates; polymeth-acrylates; vinyl polymers; and polycarbonates, and are preferably bonded via —O—C(=O)—NH—, —NH—C(=O)O—, —NH—C(=O)—NH—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR"—, —P(=O)(OR")$_2$—, —O—CH$_2$—C(OH)H—CH$_2$—NR"—, —O—CH$_2$—C(OH)H—CH$_2$—S—, —O—CH$_2$—C(OH)H—CH$_2$—C(=O)—, —O—CH$_2$—C(OH)H—CH$_2$—O—,

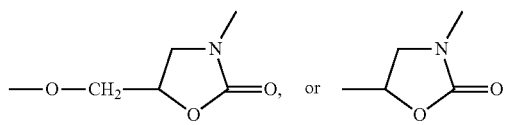

to the [CR$^1$$_2$—SiR$_a$(OR$^2$)$_{3-a}$] group, where R" may be the same or different and is a hydrogen atom or is as defined for R.

More preferably, the A radicals are polyoxyalkylene or polyacrylate radicals, especially polyoxyalkylene radicals which are bonded via —O—C(=O)—NH—, —C(=O)—O—, —O—C(=O)—O—, —O—, —O—CH$_2$—C(OH)H—CH$_2$—NR"—, —O—CH$_2$—C(OH)H—CH$_2$—S—, —O—CH$_2$—C(OH)H—CH$_2$—C(=O)— and —O—CH$_2$—C(OH)H—CH$_2$—O— to the —[CR$^1$$_2$—SiR$_a$(OR$^2$)$_{3-a}$] group, where R" may be the same or different and is a hydrogen atom or is as defined for R.

If the A radical is a polyoxyalkylene radical A1, these preferably comprise repeat units of the formula $$-R^7-O- \quad (V)$$

where
$R^7$ may be the same or different and is an optionally substituted divalent hydrocarbon radical having from 1 to 12 carbon atoms, which may be linear or branched. The polyoxyalkylene radicals A1 contain preferably at least 50%, more preferably at least 70%, of repeat units of the formula (V), based in each case on the total number of repeat units. In addition to the repeat units of the formula (V), the A1 radicals may also contain further units, for example amide, urea, urethane, thiourethane, alkylene, arylene, ester, carbonate, imide or imine units.

Examples of $R^7$ radicals are —CH$_2$—, —CH$_2$—CH$_2$—, —CH$_2$—CH(CH$_3$)—, —CH$_2$—CH$_2$—CH$_2$—, —CH$_2$—CH(—CH$_2$—CH$_3$)—, —CH(CH$_3$)—CH(CH$_3$)—, —CH$_2$—CH$_2$—CH$_2$—CH$_2$— and —CH$_2$—C(CH$_3$)$_2$—. Preferably, the $R^7$ radical is a divalent, optionally substituted hydrocarbon radical having from 1 to 4 carbon atoms, more preferably a divalent hydrocarbon radical having from 1 to 4 carbon atoms, yet more preferably —CH$_2$—CH$_2$— and CH$_2$—CH(CH$_3$)—, and especially —CH$_2$—CH(CH$_3$)—.

When the A radical is a polyacrylate radical A2, these preferably comprise repeat units of the formula $$-CH_2-C(R^8)(COOR^9)- \quad (VI)$$

where
$R^8$ may be the same or different and is a hydrogen atom or a methyl radical and
$R^9$ may be the same or different and is an optionally substituted, monovalent hydrocarbon radical. The A2 radicals contain preferably at least 50%, more preferably at least 70%, of repeat units of the formula (VI), based in each case on the total number of repeat units. In addition to the repeat units of the formula (VI), the A2 radicals may also contain further groups, for example styrene, perfluoroethylene, maleic acid or the mono- or diesters thereof or derivatives thereof such as maleimides, fumaric acid or the mono- or diesters thereof, nitrile, vinyl esters such as vinyl acetate or vinyl laurate, alkenes such as ethylene, propylene or octylene, conjugated dienes such as butadiene or isoprene, vinyl chloride, vinylene chloride, allyl chloride or allyl alcohol units. Following the terminology customary in polymer chemistry, these units are partly named according to the monomers used in the polymerization process, which is known to those skilled in the art. Examples of the $R^9$ radicals are the examples specified for the R radical.

Preferably, the $R^9$ radicals are optionally substituted hydrocarbon radicals having from 1 to 30 carbon atoms, more preferably having from 1 to 20 carbon atoms.

Examples of the repeat unit of the formula (VI) are:
—$CH_2$—$C(CH_3)(COOCH_3)$—, —$CH_2$—$C(CH_3)(COOCH_2CH_3)$—, —$CH_2$—$C(CH_3)(COOCH_2CH_2CH_3)$—, —$CH_2$—$C(CH_3)(COOCH_2CH_2CH_2CH_3)$—, —$CH_2$—$C(CH_3)(COOCH(CH_3)_2)$—, —$CH_2$—$C(H)(COOCH_2CH(CH_3)_2)$—, —$CH_2$—$C(H)(COOC(CH_3)_3)$—, —$CH_2$—$C(CH_3)(COO(CH_2)_4$—$CH_3)$—, —$CH_2$—$C(CH_3)(COO(CH_2)_5CH_3)$—, —$CH_2$—$C(CH_3)(COO$-cyclohexyl$)$-, —$CH_2$—$C(CH_3)(COO(CH_2)_6CH_3)$—, —$CH_2$—$C(CH_3)(COO(CH_2)_7CH_3)$—, —$CH_2$—$C(CH_3)(COOCH_2CH(CH_2CH_3)CH_2CH_2CH_2CH_3)$—, —$CH_2$—$C(CH_3)(COOCH_2CH(CH_3)CH_2C(CH_3)_3)$—, —$CH_2$—$C(CH_3)(COO(CH_2)_8CH_3)$—, —$CH_2$—$C(CH_3)(COO(CH_2)_9CH_3)$—, —$CH_2$—$C(CH_3)(COO(CH_2)_{11}CH_3)$—, —$CH_2$—$C(CH_3)(COO(CH_2)_{13}CH_3)$—, —$CH_2$—$C(CH_3)(COO(CH_2)_{15}CH_3)$—, —$CH_2$—$C(CH_3)(COO(CH_2)_{17}CH_3)$—, —$CH_2$—$C(CH_3)(COOPh)$-, —$CH_2$—$C(CH_3)(COOCH_2Ph)$-, —$CH_2$—$C(CH_3)(COOCH_2CH_2OCH_3)$—, —$CH_2$—$C(CH_3)(COOCH_2CH_2OH)$—, —$CH_2$—$C(CH_3)(COOCH_2CH(OCH_3)CH_3)$—, —$CH_2$—$C(CH_3)(COOCH_2CH(OH)CH_3)$—, —$CH_2$—$C(CH_3)(COO$-glycidyl$)$-, —$CH_2$—$C(CH_3)(COO$—$CH_2CH_2CH_2Si(OCH_3)_3)$—, —$CH_2$—$C(CH_3)(COO$—$CH_2CH_2CH_2Si(OCH_3)_2CH_3)$—, —$CH_2$—$C(CH_3)(COO$—$(CH_2CH_2O)_x(H))$—, —$CH_2$—$C(CH_3)(COOCF_3)$—, —$CH_2$—$C(CH_3)(COOCH_2CH_2CF_3)$— and —$CH_2$—$C(CH_3)(COOCH_2CH_2CF_2CF_3)$—; and $CH_2$—$C(H)(COOCH_3)$—, —$CH_2$—$C(H)(COOCH_2CH_3)$—, —$CH_2$—$C(H)(COOCH_2CH_2CH_3)$—, —$CH_2$—$C(H)(COOCH_2CH_2CH_2CH_3)$—, —$CH_2$—$C(H)(COOCH(CH_3)_2)$—, —$CH_2$—$C(H)(COOCH_2CH(CH_3)_2)$—, —$CH_2$—$C(H)(COOC(CH_3)_3)$—, —$CH_2$—$C(H)(COO(CH_2)_4CH_3)$—, —$CH_2$—$C(H)(COO(CH_2)_5CH_3)$—, —$CH_2$—$C(CH_3)(COOCH_2CH_2OCH_3)$—, —$CH_2$—$C(CH_3)(COOCH_2CH_2OCH_2CH_3)$—, —$CH_2$—$C(CH_3)(COOCH_2CH(OCH_3)CH_3)$— and —$CH_2$—$C(H)(COOCH_2CH(CH_2CH_3)CH_2CH_2CH_2CH_3)$—.

Particularly preferred repeat units of the formula (VI) are —$CH_2$—$C(CH_3)(COOCH_3)$—, —$CH_2$—$C(CH_3)(COOCH_2CH_3)$—, —$CH_2$—$C(CH_3)(COOCH_2CH_2CH_3)$—, —$CH_2$—$C(CH_3)(COOCH_2CH_2CH_2CH_3)$—, —$CH_2$—$C(CH_3)(COOCH(CH_3)_2)$—, —$CH_2$—$C(H)(COOCH_2CH(CH_3)_2)$—, —$CH_2$—$C(H)(COOC(CH_3)_3)$—, —$CH_2$—$C(CH_3)(COO(CH_2)_4$—$CH_3)$—, —$CH_2$—$C(CH_3)(COO(CH_2)_5CH_3)$—, —$CH_2$—$C(CH_3)(COO$-cyclohexyl$)$-, —$CH_2$—$C(CH_3)(COO(CH_2)_6CH_3)$—, —$CH_2$—$C(CH_3)(COO(CH_2)_7CH_3)$—, —$CH_2$—$C(CH_3)(COOCH_2CH(CH_2CH_3)CH_2CH_2CH_2CH_3)$—, —$CH_2$—$C(CH_3)(COOCH_2CH(CH_3)CH_2C(CH_3)_3)$—, —$CH_2$—$C(CH_3)(COO(CH_2)_8CH_3)$—, —$CH_2$—$C(CH_3)(COO(CH_2)_9CH_3)$—, —$CH_2$—$C(CH_3)(COO(CH_2)_{11}CH_3)$—, —$CH_2$—$C(CH_3)(COO(CH_2)_{13}CH_3)$—, —$CH_2$—$C(CH_3)(COO(CH_2)_{15}CH_3)$—, —$CH_2$—$C(CH_3)(COO(CH_2)_{17}CH_3)$—, —$CH_2$—$C(CH_3)(COOCH_2CH_2OCH_3)$— and —$CH_2$—$C(CH_3)(COOCH_2CH_2CH(OCH_3)CH_3)$—; and —$CH_2$—$C(H)(COOCH_3)$—, —$CH_2$—$C(H)(COOCH_2CH_3)$—, —$CH_2$—$C(H)(COOCH_2CH_2CH_3)$—, —$CH_2$—$C(H)(COOCH_2CH_2CH_2CH_3)$—, —$CH_2$—$C(H)(COOCH(CH_3)_2)$—, —$CH_2$—$C(H)(COOCH_2CH(CH_3)_2)$—, —$CH_2$—$C(H)(COOC(CH_3)_3)$—, —$CH_2$—$C(H)(COO(CH_2)_4CH_3)$—, —$CH_2$—$C(H)(COO(CH_2)_5CH_3)$—, —$CH_2$—$C(CH_3)(COOCH_2CH_2OCH_3)$—, —$CH_2$—$C(CH_3)(COOCH_2CH_2OCH_2CH_3)$—, —$CH_2$—$C(CH_3)(COOCH_2CH(OCH_3)CH_3)$— and —$CH_2$—$C(H)(COOCH_2CH(CH_2CH_3)CH_2CH_2CH_2CH_3)$—.

Preferably the A radicals, more preferably the polyoxyalkylene radicals A1, contain units of the formula $$—NR^{10}—C(=O)— \quad (VII)$$

where
$R^{10}$ may be the same or different and is a hydrogen atom or an optionally substituted, monovalent hydrocarbon radical. Examples of the $R^{10}$ radical are a hydrogen atom and the examples specified for the R radical. Preferably, the $R^{10}$ radical is a hydrogen atom or optionally substituted hydrocarbon radical having from 1 to 12 carbon atoms, more preferably a hydrogen atom or hydrocarbon radical having from 1 to 6 carbon atoms.

Examples of the $R^2$ radical are the examples specified for the R radical. Preferably, the $R^2$ radicals are alkyl radicals having from 1 to 12 carbon atoms, more preferably alkyl radicals having from 1 to 4 carbon atoms, especially the methyl and ethyl radicals.

Examples of component (A) are organic polymers comprising organyloxysilylmethyl groups, such as polyacrylates, vinyl polymers, polyurethanes and polyglycols, which may be linear or branched. These polymers can be prepared by known methods, such as addition reactions, for example hydrosilylation, Michael addition, Diels-Alder addition, the addition of isocyanate onto epoxides or onto reactive groups comprising active hydrogen such as amines, amides, hydroxyl or mercapto groups, the addition of epoxides onto reactive groups comprising active hydrogen such as amines, carbonyl groups, phenols or mercapto groups, and the addition of aziridines onto carbonyl groups or the copolymerization of vinylsilanes with monomers comprising an organic double bond or the grafting of vinylsilanes onto vinyl polymers. The preparation methods can optionally be combined with one another.

The component (A) used may also be a copolymer formed from siloxane blocks and organic polymers, as described, for example, in U.S. Pat. No. 7,060,760 (EP-B1 1 370 602), which is incorporated herein by reference for this purpose. The polymers (A) used in accordance with the invention may be either homopolymers or copolymers, each of which may be linear or branched. Component (A) may have the —$[CR^1_2$—$SiR_a(OR^2)_{3-a}]$ groups at any positions in the polymer, for instance at pendant and/or terminal positions.

Further examples of component (A) used in accordance with the invention are those of the formula (I) in which A is defined as X and at least one $R^1$ radical is a polymeric organic radical, for example a polyacrylate, vinyl polymer, polyurethane, or polyglycol, which may be linear or branched, but such are not preferred.

Component (A) used in accordance with the invention preferably has a viscosity of from 100 to 1,000,000 mPas, more preferably from 1000 to 350,000 mPas, in each case at 25° C. Components (A) are commercial products or are preparable by methods common in chemistry.

Preferably, components (B1) are those selected from the group consisting of compounds (B11) of the formula $$NR^{11}_3 \quad (VIII)$$

where $R^{11}$ may be the same or different and is a hydrogen atom or a hydrocarbon radical optionally substituted by hydroxyl groups, halogen atoms, amino groups, ether groups, ester groups, epoxy groups, mercapto groups, cyano groups or (poly)glycol radicals, where the latter are formed from oxyethylene and/or oxypropylene units, with the proviso that in formula (VIII) at most two $R^{11}$ are defined as a hydrogen atom, and aliphatic cyclic amines, for example piperidine and morpholine, organosilicon compounds (B12) having at least one organic radical comprising basic nitrogen, comprising units of the formula

$$R^{12}_k D_l Si(OR^{13})_m O_{(4-k-l-m)/2} \quad (IX)$$

in which
$R^{12}$ may be the same or different and is a monovalent, optionally substituted SiC-bonded organic radical free of basic nitrogen,
$R^{13}$ may be the same or different and is a hydrogen atom or an optionally substituted hydrocarbon radical,
D may be the same or different and is a monovalent, Si-bonded radical with basic nitrogen,
k is 0, 1, 2, or 3,
l is 0, 1, 2, 3 or 4 and
m is 0, 1, 2 or 3,
with the proviso that the sum of k+l+m is less than or equal to 4 and at least one D radical is present per molecule,
and
compounds (B13) of the formula

$$(R^{14}_2 N)_2\text{---}C\text{=}NR^{15} \quad (X)$$

where $R^{14}$ may be the same or different and is a hydrogen atom or a hydrocarbon radical optionally substituted by hydroxyl groups, halogen atoms, amino groups, ether groups, ester groups, epoxy groups, mercapto groups, imine groups, imide groups or (poly)glycol radicals, where the latter are formed from oxyethylene and/or oxypropylene units, and
$R^{15}$ is a hydrogen atom or optionally substituted hydrocarbon radicals.

Examples of $R^{11}$ radicals are the examples of optionally substituted hydrocarbon radicals specified for R, and also aminoalkyl radicals such as the 3-aminopropyl radical, the 2-aminopropyl radical, the 6-aminohexyl radical, the 2-aminoethyl radical, the 2-, 3- and 4-aminocyclohexyl radicals, the N-butyl-2-aminoethyl radical and the N,N-dimethyl-2-aminoethyl radical, hydroxyalkyl radicals such as the 2-hydroxyethyl radical, and also radicals in which two substituents may be joined to form a ring which may also contain other elements instead of the carbon atoms, such as the —CH$_2$—CH$_2$—O—CH$_2$—CH$_2$—, —CH$_2$—CH$_2$—NH—CH$_2$—CH$_2$—, —CH$_2$—CH$_2$—CH$_2$—CH$_2$—CH$_2$—, —CH$_2$—CH$_2$—NH—CH$_2$— and —CH$_2$—CH$_2$—CH$_2$—CH$_2$— radicals.

Examples of compounds (B11) are CH$_3$CH$_2$(CH$_3$)CHNH$_2$, cyclo-C$_6$H$_{11}$NH$_2$, (CH$_3$CH$_2$)$_2$N(CH$_2$)$_3$NH$_2$, (CH$_3$(CH$_2$)$_3$)$_2$N(CH$_2$)$_3$NH$_2$, CH$_3$CH$_2$CH$_2$CH$_2$NH$_2$, CH$_3$(CH$_2$)$_7$NH$_2$, (CH$_3$)$_2$CH(CH$_2$)$_5$NH$_2$, (CH$_3$CH$_2$(CH$_3$)CH)$_2$NH, (cyclo-C$_6$H$_{11}$)$_2$NH, (CH$_3$CH$_2$CH$_2$CH$_2$)$_2$NH, (CH$_3$(CH$_2$)$_7$)$_2$NH, ((CH$_3$)$_2$CH(CH$_2$)$_5$)$_2$NH, (CH$_3$CH$_2$CH$_2$CH$_2$)$_3$N, (CH$_3$(CH$_2$)$_7$)$_3$N, ((CH$_3$)$_2$CH(CH$_2$)$_5$)$_3$N, cyclic amines such as piperidine, piperazine, morpholine, 3-morpholinopropylamine, imidazolidine and pyrrolidine.

The $R^{11}$ radicals are preferably hydrocarbon radicals having from 1 to 18 carbon atoms or aminoalkyl radicals having from 1 to 18 carbon atoms, particular preference being given to the methyl, ethyl, n-propyl, isopropyl, n-butyl, isobutyl, sec-butyl, 2-ethylhexyl, cyclohexyl, 1-methylheptyl, and n-octyl radicals, the 3-aminopropyl, the 2-aminopropyl, 6-aminohexyl, 2-aminoethyl, N,N-dimethyl-2-aminoethyl and N,N-dibutyl-2-aminoethyl radicals, and also the —CH$_2$—CH$_2$—O—CH$_2$—CH$_2$—, —CH$_2$—CH$_2$—NH—CH$_2$—CH$_2$—, —CH$_2$—CH$_2$—CH$_2$—CH$_2$—CH$_2$—, —CH$_2$—CH$_2$—NH—CH$_2$— and —CH$_2$—CH$_2$—CH$_2$—CH$_2$— radicals, especially methyl, ethyl, n-butyl, 3-aminopropyl, 6-aminohexyl, 2-aminoethyl, the N,N-dimethyl-2-aminoethyl and the N,N-dibutyl-2-aminoethyl radicals, and also the —CH$_2$—CH$_2$—O—CH$_2$—CH$_2$—, —CH$_2$—CH$_2$—NH—CH$_2$—CH$_2$— and —CH$_2$—CH$_2$—CH$_2$—CH$_2$—CH$_2$— radicals.

Examples of $R^{12}$ radicals are the examples of optionally substituted hydrocarbon radicals specified for R. The $R^{12}$ radicals are preferably hydrocarbon radicals having from 1 to 18 carbon atoms, particular preference being given to the methyl, ethyl and n-propyl radicals, especially the methyl radical.

Examples of optionally substituted hydrocarbon radicals $R^{13}$ are the examples specified for the $R^2$ radical. The $R^{13}$ radicals are preferably hydrogen or optionally nitrogen- or oxygen-substituted hydrocarbon radicals having from 1 to 18 carbon atoms, more preferably hydrogen or hydrocarbon radicals having from 1 to 3 carbon atoms, especially hydrogen, or the methyl and ethyl radicals.

Examples of D radicals are radicals of the formulae H$_2$N(CH$_2$)$_2$—, H$_2$N(CH$_2$)$_3$—, H$_2$N(CH$_2$)$_2$NH(CH$_2$)$_2$—, H$_2$N(CH$_2$)$_2$NH(CH$_2$)$_3$—, H$_2$N(CH$_2$)$_2$NH(CH$_2$)$_2$NH(CH$_2$)$_3$—, H$_3$CNH(CH$_2$)$_3$—, C$_2$H$_5$NH(CH$_2$)$_3$—, H$_3$CNH(CH$_2$)$_2$—, C$_2$H$_5$NH(CH$_2$)$_2$—, H$_2$N(CH$_2$)$_4$—, H$_2$N(CH$_2$)$_5$—, H(NHCH$_2$CH$_2$)$_3$—, C$_4$H$_9$NH(CH$_2$)$_2$NH(CH$_2$)$_2$—, cyclo-C$_6$H$_{11}$NH(CH$_2$)$_3$—, cyclo-C$_6$H$_{11}$NH(CH$_2$)$_2$—, (CH$_3$)$_2$N(CH$_2$)$_3$—, (CH$_3$)$_2$N(CH$_2$)$_2$—, (C$_2$H$_5$)$_2$N(CH$_2$)$_3$—, cyclo-C$_6$H$_{11}$NH—, CH$_3$CH$_2$CH(CH$_3$)NH— and (C$_2$H$_5$)$_2$N(CH$_2$)$_2$—. The D radical is preferably H$_2$N(CH$_2$)$_3$—, H$_2$N(CH$_2$)$_2$NH(CH$_2$)$_3$—, H$_3$CNH(CH$_2$)$_3$—, C$_2$H$_5$NH(CH$_2$)$_3$—, cyclo-C$_6$H$_{11}$NH—, CH$_3$CH$_2$CH(CH$_3$)NH— and cyclo-C$_6$H$_{11}$NH(CH$_2$)$_3$ radical, particular preference being given to H$_2$N(CH$_2$)$_3$—, H$_2$N(CH$_2$)$_2$NH(CH$_2$)$_3$— and cyclo-C$_6$H$_{11}$NH(CH$_2$)$_3$ radicals.

The organosilicon compounds (B12) used in accordance with the invention may either be silanes, i.e. compounds of the formula (IX) where k+l+m=4, or siloxanes, i.e. compounds containing units of the formula (IX) where k+l+m≦0.3. If the organosilicon compounds used in accordance with the invention are organopolysiloxanes, preference is given to those which consist of units of the formula (IX).

When the organosilicon compounds containing units of the formula (IX) are silanes, k is preferably 0, 1 or 2, more preferably 0 or 1, l is preferably 1 or 2, more preferably 1, and m is preferably 1, 2 or 3, more preferably 2 or 3, with the proviso that the sum of k+l+m is 4.

Examples of the silanes of the formula (IX) optionally used in accordance with the invention are H$_2$N(CH$_2$)$_3$—Si(OCH$_3$)$_3$, H$_2$N(CH$_2$)$_3$—Si(OC$_2$H$_5$)$_3$, H$_2$N(CH$_2$)$_3$—Si(OCH$_3$)$_2$CH$_3$, H$_2$N(CH$_2$)$_3$—Si(OC$_2$H$_5$)$_2$CH$_3$, H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, (CH$_3$)$_3$Si—NH—Si(CH$_3$)$_3$, H$_2$N(CH$_2$)$_2$NH(CH$_2$)$_3$—Si(OH)$_3$, H$_2$N(CH$_2$)$_2$NH(CH$_2$)$_3$—Si(OH)$_2$CH$_3$, H$_2$N(CH$_2$)$_2$NH(CH$_2$)$_2$NH(CH$_2$)$_3$—Si(OCH$_3$)$_3$, H$_2$N(CH$_2$)$_2$NH(CH$_2$)$_2$NH(CH$_2$)$_3$—Si(OC$_2$H$_5$)$_3$, cyclo-C$_6$H$_{11}$NH(CH$_2$)$_3$—Si(OCH$_3$)$_3$, cyclo-C$_6$H$_{11}$NH(CH$_2$)$_3$—Si(OC$_2$H$_5$)$_3$, cyclo-C$_6$H$_{11}$NH(CH$_2$)$_3$—Si(OCH$_3$)$_2$CH$_3$, cyclo-C$_6$H$_{11}$NH(CH$_2$)$_3$—Si(OC$_2$H$_5$)$_2$CH$_3$, cyclo-C$_6$H$_{11}$NH(CH$_2$)$_3$—Si(OH)$_3$, cyclo-C$_6$H$_{11}$NH(CH$_2$)$_3$—Si(OH)$_2$CH$_3$, (CH$_3$)$_2$Si(NHCH(CH$_3$)CH$_2$CH$_3$)$_2$, (cyclo-C$_6$H$_{11}$NH)$_3$Si—CH$_3$, (CH$_3$CH$_2$(CH$_3$)CHNH)$_3$Si—CH$_3$, HN((CH$_2$)$_3$—Si(OCH$_3$)$_3$)$_2$ and HN((CH$_2$)$_3$—Si(OC$_2$H$_5$)$_3$)$_2$ and the partial hydrolyzates thereof, preference being given to H$_2$N(CH$_2$)$_2$NH(CH$_2$)$_3$—Si(OCH$_3$)$_3$, H$_2$N(CH$_2$)$_2$NH(CH$_2$)$_3$—Si(OC$_2$H$_5$)$_3$, H$_2$N(CH$_2$)$_2$NH(CH$_2$)$_3$—Si(OCH$_3$)$_2$CH$_3$, H$_2$N(CH$_2$)$_2$NH(CH$_2$)$_3$—Si(OC$_2$H$_5$)$_2$CH$_3$, H₂N(CH₂)₂NH(CH₂)₃—Si(OH)₃, H₂N(CH₂)₂NH(CH₂)₃—Si(OH)₂CH₃, cyclo-C₆H₁₁NH(CH₂)₃—Si(OCH₃)₃, cyclo-C₆H₁₁NH(CH₂)₃—Si(OC₂H₅)₃, cyclo-C₆H₁₁NH(CH₂)₃—Si(OCH₃)₂CH₃, cyclo-C₆H₁₁NH(CH₂)₃—Si(OC₂H₅)₂CH₃, cyclo-C₆H₁₁NH(CH₂)₃—Si(OH)₃ and cyclo-C₆H₁₁NH(CH₂)₃—Si(OH)₂CH₃ and particular preference given to H₂N(CH₂)₂NH(CH₂)₃—Si(OCH₃)₃, H₂N(CH₂)₂NH(CH₂)₃—Si(OCH₃)₂CH₃, cyclo-C₆H₁₁NH(CH₂)₃—Si(OCH₃)₃, cyclo-C₆H₁₁NH(CH₂)₃—Si(OCH₃)₂CH₃, H₂N(CH₂)₂NH(CH₂)₃—Si(OH)₃ and H₂N(CH₂)₂NH(CH₂)₃—Si(OH)₂CH₃, and in each case to the partial hydrolyzates thereof.

If the organosilicon compound containing units of the formula (IX) an organopolysiloxane, the average value of k is preferably between 0.5 and 2.5, more preferably between 1.4 and 2.0, the average value of l is preferably between 0.01 and 1.0, more preferably between 0.01 and 0.6, and the average value of m is preferably between 0 and 2.0, more preferably between 0 and 0.2, with the proviso that the sum of k, l and m is less then or equal to 3.

Examples of the siloxane containing units of the formula (IX) used optionally in accordance with the invention are
H₂N(CH₂)₃—Si(OCH₃)₂—O—Si(CH₃)(OCH₃)₂,
H₂N(CH₂)₃—Si(OC₂H5)₂—O—Si(CH₃)(OCH₃)₂,
H₂N(CH₂)₃—Si(OC₂H5)₂—O—Si(CH₃)(OC₂H₅)₂,
H₂N(CH₂)₃—Si(OCH₃)(CH₃)—O—Si(CH₃)(OCH₃)₂,
H₂N(CH₂)₃—Si(OCH₃)(CH₃)—O—Si(OCH₃)₃,
H₂N(CH₂)₃—Si(OC₂H5)(CH₃)—O—Si(OCH₃)₃,
H₂N(CH₂)₂NH(CH₂)₃—Si(OCH₃)₂—O—Si(CH₃)(OCH₃)₂,
H₂N(CH₂)₂NH(CH₂)₃—Si(OC₂H5)₂—O—Si(CH₃)(OCH₃)₂,
H₂N(CH₂)₂NH(CH₂)₃—Si(OC₂H5)₂—O—Si(CH₃)(OC₂H₅)₂,
H₂N(CH₂)₂NH(CH₂)₃—Si(OCH₃)(CH₃)—O—Si(CH₃)(OCH₃)₂,
H₂N(CH₂)₂NH(CH₂)₃—Si(OCH₃)(CH₃)—O—Si(OCH₃)₃,
H₂N(CH₂)₂NH(CH₂)₃—Si(OC₂H5)(CH₃)—O—Si(OCH₃)₃,
cyclo-C₆H₁₁NH(CH₂)₃—Si(OCH₃)₂—O—Si(CH₃)(OCH₃)₂,
cyclo-C₆H₁₁NH(CH₂)₃—Si(OC₂H₅)₂—O—Si(CH₃)(OCH₃)₂,
cyclo-C₆H₁₁NH(CH₂)₃—Si(OC₂H₅)₂—O—Si(CH₃)(OC₂H₅)₂,
cyclo-C₆H₁₁NH(CH₂)₃—Si(OCH₃)(CH₃)—O—Si(CH₃)(OCH₃)₂,
cyclo-C₆H₁₁NH(CH₂)₃—Si(OCH₃)(CH₃)—O—Si(OCH₃)₃,
cyclo-C₆H₁₁NH(CH₂)₃—Si(OC₂H₅)(CH₃)—O—Si(OCH₃)₃,
H₂N(CH₂)₃—Si(OCH₃)₂—(O—Si(CH₃)₂)₀₋₁₀₀—(O—Si(CH₃)—(CH₂)₃—NH₂)₀₋₁₀₀—O—Si(OCH₃)₂—(CH₂)₃NH₂,
H₂N(CH₂)₂NH(CH₂)₃—Si(OCH₃)₂)—(O—Si(CH₃)₂)₀₋₁₀₀—(O—Si(CH₃)—(CH₂)₃—NH(CH₂)₂NH₂)₀₋₁₀₀—O—Si(OCH₃)₂—(CH₂)₃NH(CH₂)₂NH₂,
H₂N(CH₂)₃—Si(OCH₂CH₃)₂—(O—Si(OCH₂CH₃)₂)₁₋₁₀₀—(O—Si(OCH₂CH₃)(CH₂)₃NH₂)₀₋₁₀₀—Si(OCH₂CH₃)₂—(CH₂)₃NH₂,
Si(OCH₂CH₃)₃—(O—Si(OCH₂CH₃)₂)₀₋₁₀₀—(O—Si(OCH₂CH₃)(CH₂)₃NH₂)₁₋₁₀₀—Si—(OCH₂CH₃)₃ and
cyclo-C₆H₁₁NH(CH₂)₃—Si(OCH₃)₂—(O—Si(CH₃)₂)₀₋₁₀₀—(O—Si(CH₃)—(CH₂)₃NH-cyclo-C₆H₁₁)₀₋₁₀₀—O—Si(OCH₃)₂—(CH₂)₃NH cyclo-C₆H₁₁.

Examples of the R¹⁴ radical are the examples of optionally substituted hydrocarbon radicals specified for R, the hydrogen atom, and amino imide radicals, such as the amino imide radical and the N,N-dimethylamino imide radical. The R¹⁴ radicals are preferably hydrogen, hydrocarbon radicals having from 1 to 18 carbon atoms, or amino imide radicals having from 1 to 18 carbon atoms, particular preference being given to a hydrogen atom, the methyl, isopropyl, phenyl, ortho-tolyl, amino imide and the N,N-dimethylamino imide radical, especially hydrogen and the methyl and phenyl radicals.

Examples of the R¹⁵ radicals are hydrogen and the examples of optionally substituted hydrocarbon radicals specified for R. The R¹⁵ radicals are preferably hydrogen or optionally substituted hydrocarbon radicals having from 1 to 18 carbon atoms, particular preference being given to hydrogen, the cyano radical, the 3-(trimethoxysilylpropyloxy)-2-hydroxypropyl radical and the trimethoxysilylpropyl radical, especially hydrogen.

Examples of compounds (B13) are 1,3-diphenylguanidine, 1,3-di-o-tolylguanidine, 1,3-diisopropylguanidine, 1,3-dimethylguanidine, dicyandiamide, 1,1,3,3-tetramethylguanidine, (1,1,3,3-tetramethylguanidyl)propyltrimethoxysilane, [(1,1,3,3-tetramethyl-guanidyl)propyl]methyldimethoxysilane, 1-o-tolyl-biguanidine or 1,1,5,5-tetramethylbiguanidine.

Component (B1) is preferably H₂N(CH₂)₃—Si(OCH₃)₃, H₂N(CH₂)₃—Si(OC₂H₅)₃, H₂N(CH₂)₃—Si(OCH₃)₂CH₃, H₂N(CH₂)₃—Si(OC₂H₅)₂CH₃,
H₂N(CH₂)₂NH(CH₂)₃—Si(OCH₃)₃, H₂N(CH₂)₂NH(CH₂)₃—Si(OC₂H₅)₃,
H₂N(CH₂)₂NH(CH₂)₃—Si(OCH₃)₂CH₃, (CH₃)₂Si(NHCH(CH₃)CH₂CH₃)₂,
H₂N(CH₂)₃—Si(OCH₃)₂—(O—Si(CH₃)₂)₀₋₁₀₀—(O—Si(CH₃)—(CH₂)₃—NH₂)₀₋₁₀₀—O—Si(OCH₃)₂—(CH₂)₃NH₂, H₂N(CH₂)₂NH(CH₂)₃—Si(OCH₃)₂—(O—Si(CH₃)₂)₀₋₁₀₀—(O—Si(CH₃)—(CH₂)₃NH(CH₂)₂NH₂)₀₋₁₀₀-0-Si(OCH₃)₂—(CH₂)₃NH(CH₂)₂NH₂,
H₂N(CH₂)₃—Si(OCH₂CH₃)₂—(O—Si(OCH₂CH₃)₂)₁₋₁₀₀—(O—Si(OCH₂CH₃)(CH₂)₃NH₂)₀₋₁₀₀—O—Si(OCH₂CH₃)₂—(CH₂)₃NH₂,
Si(OCH₂CH₃)₃—(O—Si(OCH₂CH₃)₂)₀₋₁₀₀—(O—Si(OCH₂CH₃)(CH₂)₃NH₂)₁₋₁₀₀—O—Si(OCH₂CH₃)₃, (cyclo-C₆H₁₁NH)₃Si—CH₃, (CH₃CH₂(CH₃)CHNH)₃Si—CH₃,
(CH₃CH₂(CH₃)CHNH)₂Si—(CH₃)₂, CH₃CH₂(CH₃)CHNH₂, cyclo-C₆H₁₁NH₂,
(CH₃CH₂)₂N(CH₂)₃NH₂, (CH₃(CH₂)₃)₂N(CH₂)₃NH₂, CH₃CH₂CH₂CH₂NH₂,
CH₃(CH₂)₇NH₂, (CH₃)₂CH(CH₂)₅NH₂, (CH₃CH₂(CH₃)CH)₂NH, (cyclo-C₆H₁₁)₂NH,
(CH₃CH₂CH₂CH₂)₂NH, (CH₃(CH₂)₇)₂NH, ((CH₃)₂CH(CH₂)₅)₂NH,
(CH₃CH₂CH₂CH₂)₃N, (CH₃(CH₂)₇)₃N, ((CH₃)₂CH(CH₂)₅)₃ N, ((CH₃)₂N)₂C=NH,
((CH₃)NH)₂C=NH, ((C₆H₅)NH)₂C=NH,
((CH₃)₂N—)C(=NH)—NH—C(=NH)—N(CH₃)₂,
((CH₃)₂ N)₂C=N—CH₂CH₂CH₂Si(OMe)₃,
((CH₃)₂N)₂C=N—CH₂CH(OH)CH₂—O—(CH₂)₃Si(OMe)₃,
particular preference being given to H₂N(CH₂)₃—Si(OCH₃)₃, H₂N(CH₂)₃—Si(OC₂H₅)₃,
H₂N(CH₂)₂NH(CH₂)₃—Si(OCH₃)₃, H₂N(CH₂)₂NH(CH₂)₃—Si(OC₂H₅)₃,
H₂N(CH₂)₂NH(CH₂)₃—Si(OCH₃)₂—(O—Si(CH₃)₂)₁₋₁₀₀—O—Si(CH₃)—(CH₂)₃,
NH(CH₂)₂NH₂)₀₋₁₀₀—Si(OCH₃)₂—(CH₂)₃NH(CH₂)₂NH₂,
H₂N(CH₂)₃—Si(OCH₂CH₃)₂—Si(OCH₂CH₃)₂)₁₋₁₀₀—(O—Si(OCH₂CH₃)(CH₂)₃NH₂)₀₋₁₀₀—O—Si(OCH₂CH₃)₂—(CH₂)₃NH₂, Si(OCH₂CH₃)₃—

(O—Si(OCH$_2$CH$_3$)$_2$)$_{0-100}$—(O—Si(OCH$_2$CH$_3$)(CH$_2$)$_3$NH$_2$)$_{1-100}$—(O—Si(OCH$_2$CH$_3$)$_3$,
(CH$_3$CH$_2$CH$_2$CH$_2$)$_2$NH, ((CH$_3$)$_2$N)$_2$C=NH, ((CH$_3$)$_2$N)$_2$C=N—CH$_2$CH$_2$CH$_2$Si(OMe)$_3$ and
((CH$_3$)$_2$N)$_2$C=N—CH$_2$CH(OH)CH$_2$—O—(CH$_2$)$_3$Si(OMe)$_3$. Components (B1) are commercial products or are preparable by processes common in chemistry.

The compounds (B2) comprising basic phosphorus are preferably those of the formula $$[R^{16}{}_4P^+]_sZ^{s-} \qquad (XI),$$

where
s is 1, 2 or 3,
$R^{16}$ may be the same or different and is an optionally substituted hydrocarbon radical having from 1 to 40 carbon atoms,
Z is a group of the formula $$O=PR^{17}{}_n(O^-)_m(OR^{18})_{3-n-m} \qquad (XII)$$

and/or condensates thereof with one or more P—O—P bonds, or a group of the formula $$^-OC(=O)R^{19} \qquad (XIII)$$

where
$R^{17}$ may be the same or different and is an optionally substituted hydrocarbon radical which may be interrupted by oxygen atoms,
$R^{18}$ may be the same or different and are hydrogen or optionally substituted hydrocarbon radicals which may be interrupted by oxygen atoms,
$R^{19}$ may be the same or different and are optionally substituted hydrocarbon radicals which may be interrupted by oxygen atoms,
n is 0, 1 or 2,
m is 1, 2 or 3 and
m+n is 1, 2 or 3.

Examples of $R^{16}$ are the radicals specified above for the R radical. The $R^{16}$ radicals are preferably optionally substituted hydrocarbon radicals having from 1 to 20 carbon atoms, more preferably hydrocarbon radicals having from 1 to 16 carbon atoms, especially hydrocarbon radicals having from 1 to 8 carbon atoms.

Examples of $R^{17}$ radicals are the examples of hydrocarbon radicals specified for the R radical, which may be substituted by halogen atoms, amino groups, ether groups, ester groups, epoxy groups, mercapto groups, cyano groups, (poly)glycol radicals, C(O)O$^-$, P(O)(R$^{23}$)O$^-$, —P(O)(OR$^{23}$)O$^-$, —C(O)OH, —C(O)OR$^{23}$, —P(O)(R$^{23}$)OH or —P(O)(OR$^{23}$)OH groups and/or which may be interrupted by oxygen atoms, where $R^{23}$ in each case may be the same or different and is as defined for $R^{16}$, for example the 4-(carboxylic acid)cyclohexyl, cyclohexyl-4-carbonate, O-ethyl-cyclohexyl-4-carbonate, 11-(carboxylic acid)undecyl, 11-undecanoate, O-isooctyl-11-undecanoate, lauryldiethyleneglycolatemethyl, 4-nonylphenylpentaethyleneglycolatemethyl, oleyletherhexaethyleneglycolatemethyl or 4-tert-butylphenyletheroligoethyleneglycolatemethyl radicals.

The $R^{17}$ radicals are preferably hydrocarbon radicals optionally substituted by halogen atoms, amino groups, ether groups, ester groups, epoxy groups, mercapto groups, cyano groups, (poly)glycol radicals, —C(O)O$^-$, —P(O)(R$^{23}$)O$^-$, —P(O)(OR$^{23}$)O$^-$, —C(O)OH, —C(O)OR$^{23}$, —P(O)(R$^{23}$)OH or —P(O)(OR$^{23}$)OH groups having from 1 to 50 carbon atoms, which may be interrupted by oxygen atoms, more preferably hydrocarbon radicals having from 1 to 30 carbon atoms, especially hydrocarbon radicals having from 1 to 20 carbon atoms, where $R^{23}$ in each case may be the same or different and is as defined for $R^{16}$.

Examples of the $R^{19}$ radical are the examples specified for the V radical. The $R^{19}$ radicals are preferably hydrocarbon radicals which have from 1 to 50 carbon atoms, may be interrupted by oxygen atoms, and are optionally substituted by halogen atoms, amino groups, ether groups, ester groups, epoxy groups, mercapto groups, cyano groups, (poly)glycol radicals, —C(O)O$^-$, —P(O)(R$^{23}$)O$^-$, —P(O)(OR$^{23}$)O$^-$, —C(O)OH, —(O)OR$^{23}$, —P(O)(R$^{23}$)OH or —P(O)(OR$^{23}$)OH groups, more preferably hydrocarbon radicals which have from 1 to 50 carbon atoms and may be interrupted by oxygen atoms and/or which may be substituted by the —C(O)OR$^{23}$, —C(O)O— or —C(O)OH group, especially hydrocarbon radicals which have from 1 to 20 carbon atoms and may be interrupted by oxygen atoms and/or which may be substituted by the —C(O)OR$^{23}$, —C(O)O— or —C(O)OH group, where $R^{23}$ in each case may be the same or different and is as defined for $R^{16}$.

Examples of $R^{18}$ radicals are hydrogen, the examples specified for the $R^{16}$, radical and the lauryldiethyleneglycolate-ethyl, 4-nonylphenyl-pentaethyleneglycolateethyl, oleyletherhexaethyleneglycolateethyl and the 4-tert-butylphenyletheroligoethyleneglycolateethyl radicals. The $R^{18}$ radicals are preferably hydrogen or optionally substituted hydrocarbon radicals which have from 1 to 50 carbon atoms and may be interrupted by oxygen atoms, more preferably a hydrogen atom, hydrocarbon radicals having from 1 to 20 carbon atoms or hydrocarbon radicals having from 1 to 40 carbon atoms, which may be interrupted by oxygen atoms, especially hydrogen or hydrocarbon radicals having from 1 to 16 carbon atoms.

Preferably, s is 1 or 2; more preferably, s is 1.

The anions Z are preferably acylate groups having from 4 to 31 carbon atoms, phosphate groups having from 4 to 30 carbon atoms, hydrogenphosphate groups having from 2 to 15 carbon atoms, phosphonate groups having from 2 to 15 carbon atoms, hydrogenphosphonate groups having from 2 to 15 carbon atoms or phosphinate groups having from 4 to 30 carbon atoms. The anions Z are more preferably acylate groups having from 6 to 25 carbon atoms, phosphate groups having from 6 to 20 carbon atoms, hydrogenphosphate groups having from 4 to 10 carbon atoms, phosphonate groups having from 2 to 12 carbon atoms, hydrogenphosphonate groups having from 2 to 12 carbon atoms, and phosphinate groups having from 6 to 24 carbon atoms. More particularly, the anions Z are acylate groups having from 2 to 25 carbon atoms, phosphonate groups having from 2 to 10 carbon atoms, hydrogenphosphonate groups having from 2 to 10 carbon atoms, or phosphinate groups having from 8 to 20 carbon atoms. Most preferably, the anions Z are acylate groups or phosphinate groups.

Examples of compounds (B2) are
tetra-n-butylphosphonium bis(2,4,4-trimethylpentyl)phosphinate,
tri-n-butylmethylphosphonium bis(2,4,4-trimethylpentyl)phosphinate,
tri-n-hexyltetradecylphosphonium bis(2,4,4-trimethylpentyl)phosphinate,
tetra-n-butylphosphonium octylhydrogenphosphonate,
bis(tetra-n-butylphosphonium)octylphosphonate,
tetra-n-butylphosphonium vinylhydrogenphosphonate,
bis(tetra-n-butylphosphonium)vinylphosphonate,
tetra-n-butylphosphonium laurylhydrogenphosphonate,
bis(tetra-n-butylphosphonium)laurylphosphonate,
tri-n-butylmethylphosphonium octylhydrogenphosphonate,
bis(tri-n-butylmethylphosphonium)octylphosphonate, tri-n-hexyl-n-tetradecylphosphonium octylhydrogenphosphonate,
bis(tri-n-hexyl-n-tetradecylphosphonium)octylphosphonate,
tetra-n-butylphosphonium bis(2-ethylhexyl)phosphate,
tetra-n-butylphosphonium dioctylphosphate,
tri-n-butylmethylphosphonium dibutylphosphate,
triethylmethylphosphonium dibutylphosphate,
tetraphenylphosphonium dibutylphosphate,
tetra-n-butylphosphonium di(ethylethoxylate lauryl ether) phosphate,
di-n-butyldimethylphosphonium dimethylphosphate,
dicyclohexyldimethylphosphonium dimethylphosphate,
diisobutyldimethylphosphonium dimethylphosphate,
tri-n-butylmethylphosphonium bis(2-ethylhexyl)phosphate,
tri-n-hexyl-n-tetradecylphosphonium dioctylphosphate,
tetra-n-butylphosphonium octylhydrogenphosphate,
bis(tetra-n-butylphosphonium)octylphosphate,
tetra-n-butylphosphonium (2-ethylhexyl)hydrogenphosphate,
bis(tetra-n-butylphosphonium)2-ethylhexylphosphate,
tetra-n-butylphosphonium butylhydrogenphosphate,
bis(tetra-n-butylphosphonium)butylphosphate,
tetra-n-butylphosphonium laurylhydrogenphosphate,
bis(tetra-n-butylphosphonium)laurylphosphate,
tri-n-butylmethylphosphonium octylhydrogenphosphate,
bis(tri-n-butylmethylphosphonium)octylphosphate,
tri-n-hexyltetradecylphosphonium octylhydrogenphosphate,
bis(tri-n-hexyltetradecylphosphonium)octylphosphate,
tetra-n-butylphosphonium n-octoate,
tetra-n-butylphosphonium 2-ethylhexanoate,
tetra-n-butylphosphonium neodecanoate,
tetra-n-butylphosphonium monomethyladipate,
tetra-n-butylphosphonium monoisobutylsuccinate,
triphenylvinylphosphonium neodecanoate,
tetraphenylphosphonium neodecanoate,
tetra-n-butylphosphonium acetate,
tetra-n-butylphosphonium glycolate ethoxylate lauryl ether,
bis(tetra-n-butylphosphonium)cyclohexyldicarbonate,
tetra-n-butylphosphonium cyclohexylhydrogencarbonate,
bis(tetra-n-butylphosphonium)dodecanedionate,
tetra-n-butylphosphonium hydrogendodecanoate,
tri-n-butylmethylphosphonium n-octoate,
tetramethylphosphonium n-octoate,
triethylmethylphosphonium n-octoate,
tri-n-butylmethylphosphonium n-octoate,
tri-n-hexyl-n-tetradecylphosphonium n-octoate and
tri-n-hexyl-n-tetradecylphosphonium decanoate.

Compound (B2) is preferably
tetra-n-butylphosphonium bis(2,4,4-trimethylpentyl)phosphinate,
tri-n-butylmethylphosphonium bis(2,4,4-trimethylpentyl) phosphinate,
tetra-n-butylphosphonium octylhydrogenphosphonate,
bis(tetra-n-butylphosphonium)octylphosphonate,
tetra-n-butylphosphonium vinylhydrogenphosphonate,
bis(tetra-n-butylphosphonium)vinylphosphonate,
tetra-n-butylphosphonium laurylhydrogenphosphonate,
bis(tetra-n-butylphosphonium)laurylphosphonate,
tri-n-butylmethylphosphonium octylhydrogenphosphonate,
bis(tri-n-butylmethylphosphonium)octylphosphonate,
tetra-n-butylphosphonium bis(2-ethylhexyl)phosphate,
tetra-n-butylphosphonium dioctylphosphate,
tri-n-butylmethylphosphonium dibutylphosphate,
triethylmethylphosphonium dibutylphosphate,
tri-n-butylmethylphosphonium bis(2-ethylhexyl)phosphate,
tetra-n-butylphosphonium octylhydrogenphosphate,
bis(tetra-n-butylphosphonium)octylphosphate,
tetra-n-butylphosphonium (2-ethylhexyl)hydrogenphosphate,
bis(tetra-n-butylphosphonium) 2-ethylhexylphosphate,
tetra-n-butylphosphonium butylhydrogenphosphate,
bis(tetra-n-butylphosphonium)butylphosphate,
tetra-n-butylphosphonium laurylhydrogenphosphate,
bis(tetra-n-butylphosphonium)laurylphosphate,
tri-n-butylmethylphosphonium octylhydrogenphosphate,
bis(tri-n-butylmethylphosphonium)octylphosphate,
tetra-n-butylphosphonium acetate,
tetra-n-butylphosphonium n-octoate,
tetra-n-butylphosphonium 2-ethylhexanoate,
tetra-n-butylphosphonium neodecanoate,
tetra-n-butylphosphonium monomethyladipate,
tetra-n-butylphosphonium monoisobutylsuccinate,
tetra-n-butylphosphonium glycolate ethoxylate lauryl ether,
bis(tetra-n-butylphosphonium)cyclohexyldicarbonate,
tetra-n-butylphosphonium cyclohexylhydrogencarbonate,
bis(tetra-n-butylphosphonium)dodecanedionate,
tetra-n-butylphosphonium hydrogendodecanoate,
tri-n butylmethylphosphonium n-octoate,
tetramethylphosphonium n-octoate,
triethylmethylphosphonium n-octoate and
tri-n-butylmethylphosphonium n-octoate,
more preferably
tetra-n-butylphosphonium bis(2,4,4-trimethylpentyl)phosphinate,
tri-n-butylmethylphosphonium bis(2,4,4-trimethylpentyl) phosphinate,
tetra-n-butylphosphonium octylhydrogenphosphonate,
bis(tetra-n-butylphosphonium)octylphosphonate,
tri-n-butylmethylphosphonium octylhydrogenphosphonate,
bis(tri-n-butylmethylphosphonium)octylphosphonate,
tetra-n-butylphosphonium bis(2-ethylhexyl)phosphate,
tetra-n-butylphosphonium dioctylphosphate,
tri-n-butylmethylphosphonium dibutylphosphate,
triethylmethylphosphonium dibutylphosphate,
tri-n-butylmethylphosphonium bis(2-ethylhexyl)phosphate,
tetra-n-butylphosphonium octylhydrogenphosphate,
bis(tetra-n-butylphosphonium)octylphosphate,
tetra-n-butylphosphonium (2-ethylhexyl)hydrogenphosphate,
bis(tetra-n-butylphosphonium) 2-ethylhexylphosphate,
tetra-n-butylphosphonium butylhydrogenphosphate,
bis(tetra-n-butylphosphonium)butylphosphate,
tetra-n-butylphosphonium laurylhydrogenphosphate,
bis(tetra-n-butylphosphonium)laurylphosphate,
tri-n-butylmethylphosphonium octylhydrogenphosphate,
bis(tri-n-butylmethylphosphonium)octylphosphate,
tetra-n-butylphosphonium n-octoate,
tetra-n-butylphosphonium 2-ethylhexanoate,
tetra-n-butylphosphonium neodecanoate,
tetra-n-butylphosphonium glycolate ethoxylate lauryl ether,
bis(tetra-n-butylphosphonium)cyclohexyldicarbonate,
tetra-n-butylphosphonium cyclohexylhydrogencarbonate,
bis(tetra-n-butylphosphonium)dodecanedionate,
tetra-n-butylphosphonium hydrogendodecanoate,
tri-n butylmethylphosphonium n-octoate,
tetramethylphosphonium n-octoate,
triethylmethylphosphonium n-octoate and
tri-n-butylmethylphosphonium n-octoate,
and especially
tetra-n-butylphosphonium bis(2,4,4-trimethylpentyl)phosphinate,
tri-n-butylmethylphosphonium bis(2,4,4-trimethylpentyl) phosphinate, tetra-n-butylphosphonium acetate, tetra-n-butylphosphonium n-octoate,
tetra-n-butylphosphonium 2-ethylhexanoate,
tetra-n-butylphosphonium neodecanoate,
tetra-n-butylphosphonium glycolate ethoxylate lauryl ether,
tri-n butylmethylphosphonium n-octoate,
tetramethylphosphonium n-octoate,
triethylmethylphosphonium n-octoate, and
tri-n-butylmethylphosphonium n-octoate.

Components (B2) used in accordance with the invention are commercial products or are preparable by methods common in chemistry.

The inventive materials preferably contain component (B) in amounts of from 0.001 to 10 parts by weight, more preferably from 0.01 to 5 parts by weight, and especially from 0.05 to 2 parts by weight, based in each case on 100 parts by weight of component (A).

The phosphorus acid (C1) is preferably are of the formula (III) where r is 1 or 2. Examples of the phosphorus acids (C1) used in accordance with the invention are mono- and diesters of phosphoric acid, such as n-octyl phosphate, (2-ethylhexyl) phosphate, di-n-octyl phosphate, di-n-butyl phosphate, bis(2-ethylhexyl) phosphate, diisooctyl phosphate, dihexadecyl phosphate; phosphonic acids and monoesters of phosphonic acid, such as n-octylphosphonic acid, monoethyloctylphosphonate, (2,4,4-trimethylpentyl)-phosphonic acid, dodecylphosphonic acid; and also phosphinic acids, such as bis(2-ethylhexyl)phosphinic acid, bis(2,4,4-trimethylpentyl) phosphinic acid, di-n-octylphosphinic acid and didodecylphosphinic acid.

More preferably, compound (C1) is a compound of the formula (II) where q=0 and r=1, where q=1 and r=1 or 2 and where q=2 and r=1, especially compounds of the formula (III) where q=1 and r=1 or 2 and where q=2 and r=1, and yet more preferably compounds of the formula (III) where q=2 and r=1.

The carboxylic acid (C2) is preferably a compound having a melting point at 1000 hPa of below 100° C., more preferably a compound having a melting point at 1000 hPa of below 100° C. and a molar mass of more than 80 g/mol, especially compounds having a melting point at 1000 hPa of below 80° C. and a molar mass of more than 120 to 1200 g/mol.

Examples of the carboxylic acids (C2) used in accordance with the invention are saturated carboxylic acids, such as octanoic acid, neodecanoic acid, 2-ethylhexanoic acid, 4-cyclohexylbutanoic acid, dodecanoic acid, palmitic acid and stearic acid; unsaturated carboxylic acids, such as oleic acid, linoleic acid, linolenic acid; aromatic carboxylic acids, such as benzoic acid; hydroxycarboxylic acids and the ethers thereof, such as glycolic acid ethers, ricinoleic acid, salicylic acid, glycolic acid ethoxylate lauryl ether with average molar masses from 360 g/mol to 1000 g/mol, glycolic acid ethoxylate 4-tert-butylphenyl ether with average molar masses from 360 g/mol to 1000 g/mol, glycolic acid ethoxylate nonylphenyl ether with average molar masses from 400 g/mol to 1000 g/mol, glycolic acid ethoxylate oleyl ether with average molar masses from 4000 g/mol to 1000 g/mol; saturated and unsaturated dicarboxylic acids, such as oxalic acid, malonic acid, succinic acid, glutaric acid, adipic acid, pimelic acid, suberic acid, nonanedioic acid, tartaric acid, malic acid, allylsuccinic acid, oxosuccinic acid, 2-oxoglutaric acid, cyclohexane-1,2-, -1,3- and -1,4-dicarboxylic acid, maleic acid, fumaric acid, phthalic acid, isophthalic acid, terephthalic acids, glutamic acid, aspartic acid, dimer acid with an average molar mass of 570 g/mol, hydrogenated dimer acid with an average molar mass of 570 g/mol; monoesters of dicarboxylic acids such as monoethyl oxalate, monomethyl malonate, monomethyl succinate, monomethyl glutarate, monomethyl cyclohexane-1,2-, -1,3- and -1,4-dicarboxylate, monomethyl phthalate, mono[2-(methacryloyloxy)ethyl]phthalate; and tricarboxylic acids such as aconitic acid, citric acid, trimer acid and hydrogenated trimer acid.

Compounds (C) are preferably compounds of the formula (III) where q=2 and r=1 and (C2).

The inventive materials preferably comprise component (C) in amounts of from 0.1 to 20 parts by weight, more preferably from 0.5 to 15 parts by weight, and especially from 1.0 to 10 parts by weight, based in each case on 100 parts by weight of component (A). The components (C) used in accordance with the invention are commercially available products or are preparable by methods common in chemistry.

The X radicals are preferably $R^3R^4N-$, $R^5O-$, $R^{5'}S-$, $(R^{5''}O)_2P(=O)-$, $O=C=N-$, $R^6C(=O)-$, or $R^{6'}O-C(=O)-$ radicals, where $R^3$ and $R^4$ are each independently a hydrogen atom or monovalent, optionally substituted hydrocarbon radical, where the $R^3R^4N-$ moiety may also be joined to form a ring which may also contain other elements instead of the carbon atoms, $R^5$ is as defined for the R radical or is a $CH_3(C=CH_2)-(C=O)-$ or $CH_3-O-(C=O)-$ radical, $R^{5'}$, $R^{5''}$, $R^6$ and $R^{6'}$ may each independently be the same or different and may be as defined for the R radical.

Examples of $R^3$ and $R^4$ radicals are a hydrogen atom and the examples specified above for R. Examples of $R^5$, $R^{5'}$, $R^{5''}$, $R^6$ and $R^{6'}$ radicals are each independently the examples specified above for R. The $R^3$ radical is preferably a methyl, ethyl, propyl, butyl, hexyl, phenyl, cyclohexyl, 2-aminoethyl, N-(2-aminoethyl)aminoethyl, 6-aminohexyl or octyl radical or a hydrogen atom or the $CH_3-O-(C=O)-$ radical. Preferably, the $R^4$ radical is a methyl, ethyl, propyl, butyl, hexyl or octyl radical or a hydrogen atom. More preferably, the two $R^3$ and $R^4$ radicals are joined to form a ring, which especially also comprises oxygen or nitrogen.

Examples of the X radical as $R^3R^4N$ in which the $R^3$ and $R^4$ radicals are bonded cyclically to one another are piperazine, morpholine or hexahydropyridine radicals bonded via a nitrogen atom, but also aromatic radicals, for example pyrrole radicals.

Preferably, the $R^5$ radical is the $CH_3(C=CH_2)-(C=O)-$ radical and the $CH_3-O-(C=O)-$ radical. Preferably, the $R^{5'}$ radical is a methyl, ethyl, propyl, butyl, hexyl or octyl radical. Preferably, the $R^{5''}$ radical is a methyl, ethyl, propyl, butyl, hexyl or octyl radical. Preferably, the $R^6$ radical is a methyl, ethyl, propyl, butyl, hexyl or octyl radical. Preferably, the $R^{6'}$ radical is a methyl, ethyl, propyl, butyl, hexyl or octyl radical.

Examples of X radicals are the N-cyclohexylamino, the N-phenylamino, the diethylamino, the N-(2-aminoethyl)amino, the N-(2-aminohexyl)amino, the N—(N'-(2-aminoethyl)2-aminoethyl)amino, the methacryloyloxy, the acetoxy, the isocyanato, the N-morpholino, the N-pyrrolidino, the N-piperidino and the O-methylcarbamato radicals.

Particularly preferred X radicals are the N-cyclohexylamino, the diethylamino, the N-(2-aminoethyl)amino, the N-(2-aminohexyl)amino, the methacryloyloxy, the acetoxy, the N-morpholino, the N-pyrrolidino, the N-piperidino and the O-methylcarbamato radical, and even more preferably the N-cyclohexylamino, the diethylamino, the N-(2-aminohexyl)amino, the methacryloyloxy, the acetoxy, the N-morpholino and the O-methylcarbamato radicals.

Examples of preferred and particularly preferred radicals for R' are the radicals specified above for the R radical. Examples of $R^{1'}$ are the radicals specified above for the $R^1$ radical. The $R^{1'}$ radicals are preferably hydrogen or hydrocarbon radicals having from 1 to 20 carbon atoms, especially hydrogen and the methyl radical.

Examples of Y radicals are all hydrolyzable radicals useful in condensation curing systems, for example halogen atoms, organyloxy radicals, Si—N-bonded amine radicals, amide radicals, oxime radicals, acyloxy radicals and amineoxy radicals. The Y radicals are preferably organyloxy radicals such as the methoxy, ethoxy, n-propoxy, i-propoxy, n-butoxy, i-butoxy, s-butoxy, tert-butoxy and 2-methoxyethoxy radicals; amido radicals such as the N-methylacetamido and benzamido radical; and eneoxy radicals such as the 2-propeneoxy radical, more preferably the methoxy, ethoxy, n-propoxy, i-propoxy, 2-methoxyethoxy, benzamido and 2-propeneoxy radicals, and especially the methoxy or ethoxy radicals.

Although it is not expressed by formula (II), the silanes (D) used in accordance with the invention may have a certain proportion of silanol groups, i.e. Y is a hydroxyl group, which is, however, not preferred. These silanol groups form generally through contact with atmospheric humidity which is generally unavoidable in practice during the preparation and storage of the organosilicon compounds of the formula (II). Silanes (D) used in accordance with the invention contain silanol groups in amounts up to not more than 5% by weight, preferably up to not more than 3% by weight, more preferably up to not more than 1.0% by weight.

Examples of the organosilicon compound (D) used in accordance with the invention are $H_2N$—$CH_2$—$Si(OCH_3)_3$, $H_2N$—$CH_2$—$Si(OCH_2CH_3)_3$, $(CH_3$—$(CH_2)_3)_2N$—$CH_2Si(OCH_2CH_3)_3$, $(H_3C$—$CH_2)_2N$—$CH_2$—$Si(OCH_2CH_3)_3$, $(CH_3$—$(CH_2)_3)_2N$—$CH_2$—$Si(OCH_3)_3$, $(H_3C$—$CH_2)_2N$—$CH_2$—$Si(OCH_3)_3$, $((CH_3)_2CH)_2N$—$CH_2$—$Si(OCH_2CH_3)_3$, $((CH_3)_2CH)_2N$—$CH_2$—$Si(OCH_3)_3$, $(CH_3CH_2(CH_3)CH)_2N$—$CH_2$—$Si(OCH_2CH_3)_3$, $(CH_3CH_2(CH_3)CH)_2N$—$CH_2$—$Si(OCH_3)_3$, $C_6H_5(CH_3)N$—$CH_2Si(OCH_2CH_3)_3$, $C_6H_5(CH_3)N$—$CH_2$—$Si(OCH_3)_3$, $C_6H_{11}(CH_3)N$—$CH_2$—$Si(OCH_2CH_3)_3$, $C_6H_{11}(CH_3)N$—$CH_2$—$Si(OCH_3)_3$, $(CH_3$—$(CH_2)_3)HN$—$CH_2$—$Si(OCH_2CH_3)_3$ $(H_3C$—$CH)HN$—$CH_2$—$Si(OCH_2CH_3)_3$, $(CH_3$—$(CH_2)_3)HN$—$CH_2$—$Si(OCH_3)_3$, $(H_3C$—$CH_2)HN$—$CH_2$—$Si(OCH_3)_3$, $((CH_3)_2CH)HN$—$CH_2$—$Si(OCH_2CH_3)_3$, $((CH_3)_2CH)HN$—$CH_2$—$Si(OCH_3)_3$, $(CH_3CH_2(CH_3)CH)HN$—$CH_2$—$Si(OCH_2CH_3)_3$, $(CH_3CH_2(CH_3)CH)HN$—$CH_2$—$Si(OCH_3)_3$, $C_6H_5HN$—$CH_2$—$Si(OCH_2CH_3)_3$, $C_6H_5HN$—$CH_2$—$Si(OCH_3)_3$, $C_6H_{11}HN$—$CH_2$—$Si(OCH_2CH_3)_3$, $C_6H_{11}HN$—$CH_2$—$Si(OCH_3)_3$, $cyclo(O(CH_2$—$CH_2)_2N)$—$CH_2$—$Si(OCH_2CH_3)_3$, $cyclo(O(CH_2$—$CH_2)_2N)$—$CH_2$—$Si(OCH_3)_3$, $cyclo(HN(CH_2$—$CH_2)_2N)$—$CH_2$—$Si(OCH_2CH_3)_3$, $cyclo(HN(CH_2$—$CH_2)_2N)$—$CH_2$—$Si(OCH_3)_3$, $H_2N$—$CH_2$—$SiCH_3(OCH_3)_2$, $H_2N$—$CH_2$—$SiCH_3(OCH_2CH_3)_2$, $(CH_3$—$(CH_2)_3)_2N$—$CH_2$—$SiCH_3(OCH_2CH_3)_2$, $(H_3C$—$CH_2)_2N$—$CH_2$—$SiCH_3(OCH_2CH_3)_2$, $(CH_3(CH_2)_3)_2N$—$CH_2$—$SiCH_3(OCH_3)_2$, $(H_3C$—$CH_2)_2N$—$CH_2SiCH_3(OCH_3)_2$, $((CH_3)_2CH)_2N$—$CH_2$—$SiCH_3(OCH_2CH_3)_2$, $((CH_3)_2CH)_2N$—$CH_2SiCH_3(OCH_3)_2$, $(CH_3CH_2(CH_3)CH)_2N$—$CH_2$—$SiCH_3(OCH_2CH_3)_2$, $(CH_3CH_2(CH_3)CH)_2N$—$CH_2$—$SiCH_3(OCH_3)_2$, $C_6H_5(CH_3)N$—$CH_2$—$SiCH_3(OCH_2CH_3)_2$, $C_6H_5(CH_3)N$—$CH_2$—$SiCH_3(OCH_3)_2$, $C_6H_{11}(CH_3)N$—$CH_2$—$SiCH_3(OCH_2CH_3)_2$, $C_6H_{11}(CH_3)N$—$CH_2$—$SiCH_3(OCH_3)_2$, $(CH_3$—$(CH_2)_3)HN$—$CH_2$—$SiCH_3(OCH_2CH_3)_2$, $(H_3C$—$CH_2)HN$—$CH_2$—$SiCH_3(OCH_2CH_3)_2$, $(CH_3$—$(CH_2)_3)HN$—$CH_2$—$SiCH_3(OCH_3)_2$, $(H_3C$—$CH_2)HN$—$CH_2$—$SiCH_3(OCH_3)_2$, $((CH_3)_2CH)HN$—$CH_2$—$SiCH_3(OCH_2CH_3)_2$, $((CH_3)_2CH)HN$—$CH_2$—$SiCH_3(OCH_3)_2$, $(CH_3CH_2(CH_3)CH)HN$—$CH_2$—$SiCH_3(OCH_2CH_3)_2$, $(CH_3CH_2(CH_3)CH)HN$—$CH_2$—$SiCH_3(OCH_3)_2$, $C_6H_5HN$—$CH_2$—$SiCH_3(OCH_2CH_3)_2$, $C_6H_5HN$—$CH_2$—$SiCH_3(OCH_3)_2$, $C_6H_{11}HN$—$CH_2$—$SiCH_3(OCH_2CH_3)_2$, $C_6H_{11}HN$—$CH_2$—$SiCH_3(OCH_3)_2$, $cyclo(O(CH_2$—$CH_2)_2N)$—$CH_2$—$SiCH_3(OCH_2CH_3)_2$, $cyclo(O(CH_2$—$CH_2)_2N)CH_2$—$SiCH_3(OCH_3)_2$, $cyclo(HN(CH_2$—$CH_2)_2N)$—$CH_2$—$SiCH_3(OCH_2CH_3)_2$, $cyclo(HN(CH_2$—$CH_2)_2N)$—$CH_2$—$SiCH_3(OCH_3)_2$, $(H_2N$—$CH_2$—$(CH_2)_5)HN$—$CH_2$—$Si(OCH_2CH_3)_3$, $(H_2N$—$H_2C$—$CH_2)HN$—$CH_2$—$Si(OCH_2CH_3)_3$, $(H_2N$—$CH_2$—$(CH_2)_5)HN$—$CH_2$—$Si(OCH_3)_3$, $(H_2N$—$H_2C$—$CH_2)HN$—$CH_2$—$Si(OCH_3)_3$, $H_3C$—$C(=O)O$—$CH_2$—$Si(OCH_2CH_3)_3$, $H_3C$—$C(=O)O$—$CH_2$—$Si(OCH_3)_3$, $H_2C=C(CH_3)$—$C(=O)O$—$CH_2$—$Si(OCH_2CH_3)_3$, $H_2C=C(CH_3)C(=O)$—$CH_2$—$Si(OCH_3)_3$, $H_3C$—$O$—$C(=O)NH$—$CH_2$—$Si(OCH_2CH_3)_3$, $(H_2N$—$CH_2$—$(CH_2)_5)HN$—$CH_2$—$SiCH_3(OCH_2CH_3)_2$, $H_3C$—$O$—$C(=O)NH$—$CH_2$—$Si(OCH_3)_3$, $(H_2N$—$H_2C$—$CH_2)HN$—$CH_2$—$SiCH_3(OCH_2CH_3)_2$, $(H_2N$—$CH_2$—$(CH_2)_5)HN$—$CH_2$—$SiCH_3(OCH_3)_2$, $(H_2N$—$H_2C$—$CH_2)HN$—$CH_2$—$SiCH_3(OCH_3)_2$, $H_3C$—$C(=O)O$—$CH_2$—$SiCH_3(OCH_2CH_3)_2$, $H_3C$—$C(=O)O$—$CH_2$—$SiCH_3(OCH_3)_2$, $H_2C=C(CH_3)$—$C(=O)O$—$CH_2$—$SiCH_3(OCH_2CH_3)_2$, $H_2C=C(CH_3)C(=O)O$—$CH_2$—$SiCH_3(OCH_3)_2$, $H_3C$—$O$—$C(=O)NH$—$CH_2$—$SiCH_3(OCH_2CH_3)_2$, $H_3C$—$O$—$C(=O)NH$—$C_2$—$SiCH_3(OCH_3)_2$, $cyclo(CH_2$—$O$—$CH)$—$CH_2$—$O$—$CH_2$—$Si(OCH_3)_3$, $cyclo(CH_2$—$O$—$CH)$—$CH_2$—$O$—$CH_2$—$Si(OCH_2CH_3)_3$, $cyclo(CH_2$—$O$—$CH)$—$CH_2$—$O$—$CH_2$—$SiCH_3(OCH_2CH_3)_2$, $cyclo(CH_2$—$O$—$CH)$—$CH_2$—$O$—$CH_2$—$SiCH_3(OCH_3)_2$, $(CH_3CH_2O)_2$—$P(=O)$—$CH_2$—$Si(OCH_3)_3$, $cyclo(O(CH_2$—$CH_2)_2N)$—$CH(CH_3)SiCH_3(OCH_2CH_3)_2$, $cyclo(O(CH_2$—$CH_2)_2N)$—$CH(CH_3)$—$SiCH_3(OCH_3)_2$, $cyclo(O(CH_2$—$CH_2)_2N)$—$CH(CH_3)$—$Si(OCH_2CH_3)_3$, $cyclo(O(CH_2$—$CH_2)_2N)$—$CH(CH_3)$—$Si(OCH_3)_3$, $cyclo(CH_2$—$CH_2$—$CH_2$—$C(=O)N)$—$CH(CH_3)$—$SiCH_3(OCH_2CH_3)_2$, $cyclo(CH_2$—$CH_2$—$CH_2$—$C(=O)N)$—$CH(CH_3)$—$SiCH_3(OCH_3)_2$, $cyclo(CH_2$—$CH_2$—$CH_2$—$C(=O)N)$—$CH(CH_3)$—$Si(OCH_2CH_3)_3$ and $cyclo(CH_2$—$CH_2$—$CH_2$—$C(=O)N)$—$CH(CH_3)$—$Si(OCH_3)_3$, and the partial hydrolyzates thereof.

The organosilicon compounds (D) used in accordance with the invention are preferably $(CH_3$—$(CH_2)_3)_2N$—$CH_2$—$Si(OCH_2CH_3)_3$, $(H_3C$—$CH_2)_2N$—$CH_2$—$Si(OCH_2CH_3)_3$, $(CH_3$—$(CH_2)_3)_2N$—$CH_2$—$Si(OCH_3)_3$, $(H_3C$—$CH_2)_2N$—$CH_2$—$Si(OCH_3)_3$, $(CH_3CH_2(CH_3)CH)_2N$—$CH_2$—$Si(OCH_2CH_3)_3$, $(CH_3CH_2(CH_3)CH)_2N$—$CH_2$—$Si(OCH_3)_3$, $C_6H_5(CH_3)N$—$CH_2$—$Si(OCH_2CH_3)_3$, $C_6H_5(CH_3)N$—$CH_2$—$Si(OCH_3)_3$, $(CH_3$—$(CH_2)_3)HN$—$CH_2$—$Si(OCH_2CH_3)_3$, $(H_3C$—$CH_2)HN$—$CH_2$—$Si(OCH_2CH_3)_3$, $(CH_3$—$(CH_2)_3)HN$—$CH_2$—$Si(OCH_3)_3$, $(H_3C$—$CH_2)HN$—$CH_2$—$Si(OCH_3)_3$, $((CH_3)_2CH)HN$—$CH_2$—$Si(OCH_2CH_3)_3$, $((CH_3)_2CH)HN$—$CH_2$—$Si(OCH_3)_3$, $(CH_3CH_2(CH_3)CH)HN$—$CH_2$—$Si(OCH_2CH_3)_3$, $(CH_3CH_2(CH_3)CH)HN$—$CH_2$—$Si(OCH_3)_3$, $C_6H_{511}N$—$CH_2$—$Si(OCH_2CH_3)_3$, $C_6H_5HN$—$CH_2$—$Si(OCH_3)_3$, $C_6H_{11}HN$—$CH_2$—$Si(OCH_2CH_3)_3$, $C_6H_{11}HN$—$CH_2$—$Si(OCH_3)_3$, $cyclo(O(CH_2$—$CH_2)_2N)$—$CH_2$—$Si(OCH_2CH_3)_3$, $cyclo(O(CH_2$—$CH_2)_2N)$—$CH_2$—$Si(OCH_3)_3$, $(H_2N$—$CH_2$—$(CH_2)_5)HN$—$CH_2$—$Si(OCH_2CH_3)_3$, $(H_2N$—$CH_2$—$(CH_2)_5)HN$—$CH_2$—$Si(OCH_3)_3$, $(CH_3$—$(CH_2)_3)_2N$—$CH_2$—$SiCH_3(OCH_2CH_3)_2$, $(H_3C$—$CH_2)_2N$—$CH_2$—$SiCH_3(OCH_2CH_3)_2$, $(H_3C$—$CH_2)_2N$—$CH_2$—$SiCH_3(OCH_3)_2$, $(CH_3CH_2(CH_3)CH)_2N$—$CH_2$—$SiCH_3(OCH_2CH_3)_2$, $(CH_3CH_2(CH_3)CH)_2N$—$CH_2$—$SiCH_3(OCH_3)_2$, $C_6H_5HN$—$CH_2$—$SiCH_3(OCH_2CH_3)_2$, $C_6H_5HN$—$CH_2$—$SiCH_3(OCH_3)_2$, $C_6H_{11}HN$—$CH_2$—$SiCH_3(OCH_2CH_3)_2$, $C_6H_{11}HN$—$CH_2$—$SiCH_3(OCH_3)_2$, $cyclo(O(CH_2$—$CH_2)_2N)$—$CH_2$—$SiCH_3(OCH_2CH_3)_2$, $cyclo(O(CH_2$—$CH_2)_2N)$—$CH_2$—$SiCH_3(OCH_3)_2$, $H_3C$—$C(=O)O$—$CH_2$—$Si(OCH_2CH_3)_3$, $H_3C$—$C(=O)O$—$CH_2$—$Si(OCH_3)_3$, $H_2C=C(CH_3)$—$C(=O)$ O—CH$_2$—Si(OCH$_2$CH$_3$)$_3$, H$_2$C=C(CH$_3$)C(=O)O—CH$_2$—Si(OCH$_3$)$_3$, H$_3$C—O—C(=O)NH—CH$_2$—Si(OCH$_2$CH$_3$)$_3$, H$_3$C—O—C(=O)NH—CH$_2$—Si(OCH$_3$)$_3$, H$_3$, C—C(=CO)O—CH$_2$—SiCH$_3$(OCH$_2$CH$_3$)$_2$, H$_3$, C—C(=O)O—CH$_2$—SiCH$_3$(OCH$_3$)$_2$, H$_2$C=C(CH$_3$)—C(=O)—CH$_2$—SiCH$_3$(OCH$_2$CH$_3$)$_2$, H$_2$C=C(CH$_3$)C(=O)O—CH$_2$—SiCH$_3$(OCH$_3$)$_2$, H$_3$C—O—C(=O)NH—CH$_2$—SiCH$_3$(OCH$_2$CH$_3$)$_2$ and H$_3$C—O—C(=O)NH—CH$_2$—SiCH$_3$(OCH$_3$)$_2$ and the partial hydrolyzates thereof, particular preference being given to (H$_3$C—CH$_2$)$_2$N—CH$_2$—Si(OCH$_2$CH$_3$)$_3$, (H$_3$C—CH$_2$)$_2$N—CH$_2$—Si(OCH$_3$)$_3$, C$_6$H$_5$(CH$_3$)N—CH$_2$—Si(OCH$_3$)$_3$, C$_6$H$_{11}$HN—CH$_2$—Si(OCH$_2$CH$_3$)$_3$, C$_6$H$_{11}$HN—CH$_2$—Si(OCH$_3$)$_3$, cyclo(O(CH$_2$—CH$_2$)$_2$N)—CH$_2$—Si(OCH$_2$CH$_3$)$_3$, cyclo(O(CH$_2$—CH$_2$)$_2$N)—CH$_2$—Si(OCH$_3$)$_3$, C$_6$H$_5$HN—CH$_2$—SiCH$_3$(OCH$_3$)$_2$, C$_6$H$_{11}$HN—CH$_2$—SiCH$_3$(OCH$_2$CH$_3$)$_2$, C$_6$H$_{11}$HN—CH$_2$—SiCH$_3$(OCH$_3$)$_2$, cyclo(O(CH$_2$—CH$_2$)$_2$N)—CH$_2$—SiCH$_3$(OCH$_2$CH$_3$)$_2$, cyclo(O(CH$_2$—CH$_2$)$_2$N)—CH$_2$—SiCH$_3$(OCH$_3$)$_2$, H$_3$C—C(=O)O—CH$_2$—Si(OCH$_2$CH$_3$)$_3$, H$_2$C=C(CH$_3$)—C(=O)O—CH$_2$—Si(OCH$_2$CH$_3$)$_3$, H$_2$C=C(CH$_3$)C(=O)O—CH$_2$—Si(OCH$_3$)$_3$, H$_3$C—O—C(=O)NH—CH$_2$—Si(OCH$_2$CH$_3$)$_3$, H$_3$C—O—C(=O)NH—CH$_2$—Si(OCH$_3$)$_3$, H$_2$C=C(CH$_3$)C(=O)O—CH$_2$—SiCH$_3$(OCH$_2$CH$_3$)$_2$, H$_2$C=C(CH$_3$)C(=O)O—CH$_2$—SiCH$_3$(OCH$_3$)$_2$, H$_3$C—O—C(=O)NH—CH$_2$—SiCH$_3$(OCH$_2$CH$_3$)$_2$ and H$_3$C—O—C(=O)NH—CH$_2$—SiCH$_3$(OCH$_3$)$_2$, and the partial hydrolyzates thereof.

The organosilicon compounds (D) are commercially available products or can be prepared by methods common in silicon chemistry. The inventive materials preferably contain organosilicon compound (D) in amounts of from 0.01 to 20 parts by weight, more preferably from 0.5 to 10 parts by weight, and especially from 1.0 to 5.0 parts by weight, based in each case on 100 parts by weight of component (A).

In addition, the inventive materials may comprise all further substances which have also been used to date in crosslinkable materials, for example further crosslinkers (E), plasticizers (F), fillers (G), adhesion promoters (H) and additives (I), where (E), (F) and (H) are different than components (A) to (D).

The crosslinkers (E) which may be used in the inventive materials may be any crosslinkers known to date having at least two condensable radicals, for example silanes having at least two organyloxy groups which are different than component (B12) and component (D).

More preferably, the crosslinkers (E) which may be used in the inventive materials are silane crosslinkers, such as tetramethoxysilane, tetraethoxysilane, tetrapropoxysilane, tetrabutoxysilane, methyltrimethoxysilane, dimethyldimethoxysilane, methyltriethoxysilane, methylvinyldimethoxysilane, vinyltrimethoxysilane, butyltrimethoxysilane, vinyltriethoxysilane, phenyltrimethoxysilane, diphenyldimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, 1,2-bis(triethoxysilyl)ethane, methyltriacetoxysilane, ethyltriacetoxysilane, propyltriacetoxysilane, di-t-butoxydiacetoxysilane, methyltris(methylethylketoxime)silane and vinyltris(methylethylketoxime)silane, tetrakis(methylethylketoxime)silane, bis(N-methylbenzamido)ethoxymethylsilane, methyltris(propenyloxy)silane, vinyltris(propenyloxy)silane and the partial hydrolyzates thereof, which may optionally also be prepared by cohydrolysis, for example by cohydrolysis of methyltrimethoxysilane and dimethyldimethoxysilane.

The crosslinkers (E) which may be used in the inventive materials are commercially available products or can be prepared by processes known in silicon chemistry. If the inventive materials comprise crosslinkers (E), the amounts are preferably from 0.1 to 10 parts by weight, more preferably from 0.5 to 3 parts by weight, based in each case on 100 parts by weight of component (A). The inventive materials preferably do not comprise any additional crosslinker (E).

Examples of plasticizers (F) are room temperature liquid dimethylpolysiloxanes end-capped by trimethylsiloxy groups, especially those having viscosities at 25° C. in the range between 50 and 1000 mPas, and also high-boiling hydrocarbons, for example paraffin oils, dialkylbenzenes, dialkylnaphthalenes or mineral oils consisting of naphthenic and paraffinic units, polyglycols, especially polypropylene glycols, which may optionally be substituted, high-boiling esters, for example phthalates, citric esters or diesters of dicarboxylic acids, liquid polyesters, polyacrylates or polymethacrylates, and also alkylsulfonic esters.

If the inventive materials comprise plasticizers (F), the amounts are preferably from 1 to 300 parts by weight, more preferably from 10 to 200 parts by weight, and especially from 20 to 100 parts by weight, based in each case on 100 parts by weight of constituent (A). The inventive materials preferably comprise plasticizers (F).

Examples of fillers (G) are nonreinforcing fillers, i.e. fillers with a BET surface area of up to 50 m$^2$/g, such as quartz, diatomaceous earth, calcium silicate, zirconium silicate, zeolites, metal oxide powders, such as aluminum oxides, titanium oxides, iron oxides or zinc oxides or mixed oxides thereof, barium sulfate, calcium carbonate, gypsum, silicon nitride, silicon carbide, boron nitride, glass and polymer powders, such as polyacrylonitrile powder; reinforcing fillers, i.e. fillers with a BET surface area of more than 50 m2/g, such as fumed silica, precipitated silica, precipitated chalk, carbon black such as furnace black and acetylene black, and silicon-aluminum mixed oxides of high BET surface area; hollow spherical fillers, such as ceramic microspheres, for example those obtainable under the trade name Zeeospheres™, elastic polymer spheres, for example those obtainable under the trade name EXPANCEL®, or glass spheres; fibrous fillers, such as asbestos and polymer fibers. The fillers mentioned may be hydrophobized, for example by treatment with organosilanes or -siloxanes or with stearic acid, or by etherification of hydroxyl groups to alkoxy groups. If fillers (G) are used, they are preferably hydrophobic fumed silica and precipitated or ground calcium carbonate.

If the inventive materials comprise fillers (G), the amounts are preferably from 1 to 300 parts by weight, more preferably from 1 to 200 parts by weight, and especially from 5 to 200 parts by weight, based in each case on 100 parts by weight of constituent (A). The inventive materials preferably comprise fillers (G).

Examples of the adhesion promoters (H) used in the inventive materials are silanes and organopolysiloxanes with functional groups, for example those with glycidoxypropyl, amino or methacryloyloxypropyl radicals, and also tetraalkoxysilanes and siloxanes containing T or Q groups, which may optionally comprise alkoxy groups. If, however, another component, for instance component (A), (B12), (D) or crosslinker (E), has the functional groups mentioned, it is possible to dispense with addition of adhesion promoters. If the inventive materials comprise adhesion promoters (H), the amounts are preferably from 0.1 to 50 parts by weight, more preferably from 0.5 to 20 parts by weight, and especially from 1 to 10 parts by weight, based in each case on 100 parts by weight of constituent (A). The inventive materials preferably comprise adhesion promoters (H).

Examples of additives (I) are pigments, dyes, odorants, oxidation inhibitors such as sterically hindered phenols, e.g. 2,6-di-tert-butyl-4-methylphenol (BHT), 4,6-(dodecylthiomethyl)-o-cresol, pentaerythrityl tetrakis(3-(3,5-di-tert-butyl-4-hydroxyphenyl)propionate or $C_7$-$C_9$-branched alkyl[3-(3,5-di-tert-butyl-4-hydroxyphenyl)]propionate or vitamin E, fungicides, for example isothiazolinones, especially n-2-octyl-2H-isothiazolin-3-one, n-butyl-1,2-benzisothiazolin-3-one or 4,5-dichloro-2-octyl-3(2H)-isothiazolin-3-one, 3-iodo-2-propynylbutyl carbamate, thiabendazole, carbendazim, 3-benzo[b]thien-2-yl-5,6-dihydro-1,4,2-oxathiazine 4-oxide, benzothiophene-2-cyclohexylcarboxamide S,S-dioxide, 2-thiazol-4-yl-1H-benzoimidazole, silver-containing carriers or nanosilver, triazole derivatives, such as tebuconazole, or combinations of two or three active ingredients, agents for influencing the electrical properties, such as conductive carbon black, flameproofing agents, light stabilizers, such as UV absorbers, e.g. benzotriazole derivatives, for example 2-(2H-benzotriazol-2-yl)-4,6-bis(1-methyl-1-phenylethyl)phenol, 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-methyl-6-dodecylphenol, 2-(2H-benzotriazol-2-yl)-4-alkyl-PEG-6-t-butylphenol, nanometal oxides, for example of titanium or zinc, cyanoacrylates, e.g. Uvinul® 3030, Uvinul® 3035 or Uvinul® 3039 from BASF AG, Germany, benzophenones, for example Uvinul® 3008, such as free-radical scavengers, e.g. sterically hindered amines (HALS, e.g. Tinuvin® 622, Tinuvin® 765, Tinuvin® 770 or Tinuvin® 123 from Ciba, Switzerland, or Uvinul® 4050H, Uvinul® 4077H, Uvinul® 4092H, Uvinul® 505011, or Uvinul® 506211 from BASF AG, Germany), agents for prolonging the skin formation time, such as silanes with an SiC-bonded mercaptoalkyl radical, cell-generating agents, for example azodicarbonamide, heat stabilizers, such as triisodecyl phosphite, tris(nonylphenyl) phosphite or diisodecyl phenyl phosphite, scavengers, such as Si—N-containing silazanes or silylamides, thixotropic agents, for example amide waxes, hydrogenated castor oil or polyglycols, and organic solvents, such as alkylaromatics, n-methylpyrrolidone, dipropylene glycol dimethyl ether, butyl glycolate, 2,2,4-trimethylpentane-1,3-diol monoisobutyrate, diethylene glycol n-butyl ether acetate or triethyl phosphate.

If the inventive materials comprise additives (I), the amounts are preferably from 0.01 to 100 parts by weight, more preferably from 0.05 to 30 parts by weight, especially from 0.1 to 10 parts by weight, based in each case on 100 parts by weight of constituent (A). The inventive materials preferably comprise additives (I).

More preferably, the inventive materials are those preparable using
(A) compounds of the formula (I),
(B) organic bases of the formula (VIII) and/or (IX) and/or (X) and/or (XI),
(C) organic acids of the formula (III) and/or (IV),
(D) silanes of the formula (II), and optionally, one or more of
(E) crosslinkers,
(F) plasticizers,
(G) fillers,
(H) adhesion promoters, and
(I) additives selected from the group consisting of antioxidants, UV absorbers and sterically hindered amines.

More particularly, the inventive materials, apart from components (A) to (I), do not comprise any further constituents. The inventive materials are preferably viscous to pasty materials.

To prepare the inventive materials, all constituents can be mixed with one another in any sequence. This mixing can be effected at room temperature and the pressure of the surrounding atmosphere, i.e. from about 900 to 1100 hPa. If desired, this mixing can also be effected at higher temperatures, for example at temperatures in the range from 35 to 135° C. In addition, it is possible to temporarily or constantly mix under reduced pressure, for example at absolute pressure from 30 to 500 hPa, in order to remove volatile compounds and/or air. Preference is given to effecting the inventive mixing of the individual constituents with very substantial exclusion of water.

The individual constituents of the inventive materials may each either be one type of such constituents or a mixture of at least two different types of such constituents, and all of the various R, X, Y, etc., can be the same or different.

For the crosslinking of the inventive materials, the typical water content of air is sufficient. The crosslinking of the inventive materials is preferably effected at room temperature. It can, if desired, also be carried out at temperatures higher or lower than room temperature, for example at from −5° to 15° C. or from 30° to 50° C. and/or by means of concentrations of water exceeding the normal water content of air. The crosslinking is carried out preferably at a pressure of from 100 to 1100 hPa, especially at the pressure of the surrounding atmosphere, i.e. from about 900 to 1100 hPa.

The present invention further provides moldings produced by crosslinking the inventive materials.

The inventive materials can be used for all end uses for which materials which are storable with exclusion of water and crosslink to elastomers on ingress of water at room temperature can be used. The inventive materials thus have excellent suitability, for example, as sealants for joints, including vertical joints, and similar cavities having an internal diameter of, for example, from 10 to 40 mm, for example of buildings, land vehicles, watercraft and aircraft, or as adhesives or cementing compositions, for example in window construction or in the production of glass cabinets and, for example, for the production of protective coatings, or coatings preventing sliding, or of elastomeric moldings and for the insulation of electrical or electronic devices.

The inventive materials have the advantage that they are easy to prepare. The inventive condensation-crosslinkable materials have the distinct advantage that they comprise only exceptionally small amounts, if any, of heavy metal compounds and are thus free of labeling requirements and toxicologically safe. Furthermore, the inventive materials have the advantage that they do not yellow in the course of storage or in the cured state, that it is thus also possible to produce high-grade transparent products, and the still further advantages that they feature a very high storage stability and that the resilience is adjustable within a wide range.

In the examples described below, all viscosity data are based on a temperature of 25° C. Unless stated otherwise, the examples which follow are carried out at a pressure of the surrounding atmosphere, i.e., for instance, at 1000 hPa, and at room temperature, i.e. at about 23° C., or at a temperature which is established when the reactants are combined at room temperature without additional heating or cooling, and at a relative atmospheric humidity of about 50%. In addition, all parts and percentage data, unless stated otherwise, are based on weight.

Test 1:
Assessment of the Resilience

To assess the resilience, the crosslinkable materials obtained in the examples are applied to PE film in a layer of thickness 2 mm and stored under standard climatic conditions (23° C. and 50% relative atmospheric humidity). After one day, the skin formed is removed from the PE film and stored for a further 6 days hanging freely under standard climatic conditions (23° C. and 50% relative atmospheric humidity). Subsequently, an S2 specimen (see ISO 37) is punched out and a section of length 20 mm is marked on the strip. This section is now stretched to 40 mm for 24 hours and then stored in the unstretched state for one hour. After this hour, the length of the marking in mm is measured and the resilience is calculated by means of the formula (resilience in %=(40−measured value)/20×100). The resulting value in % is rounded to the closest integer. Values above 60% are considered to be positive.

Test 2:
Determination of the Skin Formation Time

To determine the skin formation time, the crosslinkable materials obtained in the examples are applied to PE film in a layer of thickness 2 mm and stored under standard climatic conditions (23° C. and 50% relative atmospheric humidity). During the curing, the formation of a skin is checked every 5 min. For this purpose, a dry finger is placed cautiously onto the surface of the sample and pulled upward. When sample remains stuck to the finger, no skin has formed yet. When no sample remains stuck to the finger any longer, a skin has formed and the time is noted.

Test 3:
Determination of the pH

To determine the pH, constituents (B), (C) and (D) are mixed in the ratio used and left to stand for one hour, and then a small sample is applied to moistened universal indicator paper (e.g. universal indicator from Merck, Germany, with a measurement range of pH 1-14). The pH is determined after an action time of from 1 to 3 min by comparison with the color scale.

Hereinafter, Me shall represent a methyl group.

Example 1

444 g of a linear polypropylene glycol which has a group of the formula $(MeO)_2MeSi-CH_2-NH-C(=O)-$ at each chain end, each of which is joined to the —O— of the polypropylene glycolate, and which has a viscosity at 25° C. of approx. 30,000 mPa·s (commercially available under the name GENIOSIL® STP-E30 from Wacker Chemie AG, Germany), 300 g of a polypropylene glycol monohydroxymonobutyl ether having a viscosity at 50° C. of 240 mPa·s and a water content, determined by means of Karl-Fischer titration, of 120 ppm and 24 g of N-(trimethoxysilylmethyl)-O-methylcarbamate (commercially available under the name GENIOSIL® XL 63 from Wacker Chemie AG, Germany) are mixed with one another in a planetary mixer and stirred for 5 minutes. Subsequently, the mixture is completed by homogeneously mixing in 75 g of fumed hydrophobic silica having a specific surface area of 200 m$^2$/g (commercially available under the name HDK® H18 from Wacker Chemie AG, Munich, Germany), 6.0 g of a liquid stabilizer mixture consisting of approx. 50% of a sterically hindered amine, principally consisting of bis(1,2,2,6,6-pentamethyl-4-piperidyl) sebacate and methyl 1,2,2,6,6-pentamethyl-4-piperidyl sebacate, as a free-radical scavenger, approx. 35% of a UV absorber of the benzotriazole type, principally consisting of 2-(2H-benzotriazol-2-yl)-4-methyl-6-dodecylphenol and approx. 15% of a sterically hindered phenol, principally consisting of C7-C9-branched alkyl[3-(3,5-di-tert-butyl-4-hydroxyphenyl)]propionate as an oxidation inhibitor (commercially available under the name Tinuvin® B 75 from Bodo Möller Chemie GmbH, Germany), 0.25 g of tetramethylguanidine (commercially available from Sigma-Aldrich, Germany) and 2.0 g of octanoic acid (commercially available from Sigma-Aldrich, Germany). Finally, the mixture is stirred at absolute pressure approx. 100 mbar for 5 minutes, transferred under airtight conditions and stored. After one day of storage at room temperature, tests 1 to 3 are carried out. The results can be found in table 1.

Comparative Example 1

The procedure described in example 1 was repeated, with the modification that 0.5 g of tetramethylguanidine was used instead of 0.25 g of tetramethylguanidine. After one day of storage at room temperature, tests 1 to 3 are carried out. The results can be found in table 1.

Comparative Example 2

The procedure of example 1 was repeated, with the modification that 0.75 g of tetramethylguanidine was used instead of 0.25 g of tetramethylguanidine. After one day of storage at room temperature, tests 1 to 3 are carried out. The results can be found in Table 1.

TABLE 1

| Example | pH of the mixture of components (B), (C) and (D) | Skin formation time (min) | Resilience (%) |
|---|---|---|---|
| 1 | 7 | 60 | 65 |
| C1 | 8 | 30 | 28 |
| C2 | 8.5 | 20 | 0 |

Example 2

444 g of a linear polypropylene glycol which has a group of the formula $(MeO)_2MeSi-CH_2-NH-C(=O)-$ at each chain end, each of which is joined to the —O— of the polypropylene glycolate, and which has a viscosity of approx. 30,000 mPa·s (commercially available under the name GENIOSIL® STP-E30 from Wacker Chemie AG, Germany), 150 g of a polypropylene glycol monohydroxymonobutyl ether having a viscosity at 50° C. of 240 mPa·s and a water content, determined by means of Karl-Fischer titration, of 120 ppm, 24 g of N-(trimethoxysilylmethyl)-O-methylcarbamate (commercially available under the name GENIOSIL® XL 63 from Wacker Chemie AG, Germany) and 8 g of a mixture of 1 mol of (3-aminopropyl)trimethoxysilane (commercially available under the name GENIOSIL® GF 96 from Wacker Chemie AG, Germany) and 2 mol of (3-glycidoxypropyl)trimethoxysilane (commercially available under the name GENIOSIL® GF 80 from Wacker Chemie AG, Germany), which had been stored at room temperature for at least four weeks, are mixed with one another in a planetary mixer and stirred for 5 minutes. Subsequently, 80 g of fumed hydrophobic silica having a specific surface area of 200 m$^2$/g (commercially available under the name HDK® H18 from Wacker Chemie AG, Munich, Germany) are stirred in and homogenized at an absolute pressure of 100 mbar for 5 min Subsequently, the mixture is completed by homogeneously mixing in 6.0 g of a liquid stabilizer mixture consisting of approx. 50% of a sterically hindered amine, principally consisting of bis(1,2,2,6,6-pentamethyl-4-piperidyl) sebacate and methyl 1,2,2,6,6-pentamethyl-4-piperidyl sebacate, as a free-radical scavenger, approx. 35% of a UV absorber of the benzotriazole type, principally consisting of 2-(2H-benzotriazol-2-yl)-4-methyl-6-dodecylphenol and approx. 15% of a sterically hindered phenol, principally consisting of C7-C9-branched alkyl[3-(3,5-di-tert-butyl-4-hydroxyphenyl)]propionate as an oxidation inhibitor (commercially available under the name Tinuvin® B 75 from Bodo Möller Chemie GmbH, Germany), 150 g of a polypropylene glycol monohydroxymonobutyl ether having a viscosity at 50° C. of 240 mPa·s and a water content, determined by means of Karl-Fischer titration, of 120 ppm, 0.75 g of a mixture of 1 mol of tetrabutylphosphonium hydroxide dewatered under a reduced pressure of absolute pressure approx. 2 mbar and at a maximum of 80° C. (commercially available as a 40% solution in water from Sigma-Aldrich, Germany) and 1 mol of bis(2,4,4-trimethylpentyl)phosphinic acid (commercially available from Sigma-Aldrich, Germany) and 5.0 g of bis(2,4,4-trimethylpentyl)phosphinic acid (commercially available from Sigma-Aldrich, Germany). Finally, the mixture is stirred at absolute pressure approx. 100 mbar for 5 minutes, transferred under airtight conditions and stored. After one day of storage at room temperature, tests 1 to 3 are carried out. The results can be found in table 2.

Comparative Example 3

The procedure of example 2 was repeated, with the modification that, in addition, 5.0 g of (3-aminopropyl)-trimethoxysilane (commercially available under the name GENIOSIL® GF 96 from Wacker Chemie AG, Germany) were used together with the stabilizer. After storage at room temperature for one day, tests 1 to 3 are carried out. The results can be found in table 2.

Comparative Example 4

The procedure of example 2 was repeated, with the modification that, in addition, 10.0 g of (3-aminopropyl)-trimethoxysilane (commercially available under the name GENIOSIL® GF 96 from Wacker Chemie AG, Germany) were used together with the stabilizer. After storage at room temperature for one day, tests 1 to 3 are carried out. The results can be found in Table 2.

TABLE 2

| Example | pH of the mixture of components (B), (C) and (D) | Skin formation time (min) | Resilience (%) |
|---------|---------|---------|---------|
| 2 | 5 | 20 | 75 |
| C3 | 8 | 20 | 15 |
| C4 | 8 | 15 | 0 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A moisture free, moisture-curable, single component, room temperature vulcanizable composition which is storage stable with exclusion of water and cures to a solid elastomer in the presence of water, comprising:

(A) at least one compound of the formula $$A-[CR^1{}_2—SiR_a(OR^2)_{3-a}]_x \qquad (I),$$

where

A is an x-valent organic radical bonded to $—CR^1{}_2—$ via nitrogen, phosphorus, oxygen, sulfur or a carbonyl group, R each independently is a monovalent, optionally substituted hydrocarbon radical, $R^1$ each independently is hydrogen or a monovalent, optionally substituted hydrocarbon radical, $R^2$ each independently is a monovalent, optionally substituted hydrocarbon radical, x is an integer from 1 to 10, a is 0, 1 or 2, (B) at least one compound which contains at least one basic element of main group 5, selected from the group consisting of (B1) compounds comprising basic nitrogen and (B2) compounds comprising basic phosphorus, (C) at least one acid selected from the group consisting of (C1) phosphorus acids of the formula $$O=PR^{20}{}_q(OH)_r(OR^{21})_{3-q-r} \qquad (III)$$

and/or condensates thereof with one or more P—O—P bonds and (C2) carboxylic acids of the formula $$HOC(=O)R^{22} \qquad (IV),$$

where $R^{20}$ each independently is an optionally substituted hydrocarbon radical which may be interrupted by oxygen atoms, $R^{21}$ each independently is a hydrogen atom or an optionally substituted hydrocarbon radical which may be interrupted by oxygen atoms, $R^{22}$ each independently is an optionally substituted hydrocarbon radical which may be interrupted by oxygen atoms, q is 0, 1 or 2, r is 1, 2 or 3 and q+r is 1, 2 or 3, and (D) at least one silane of the formula $$X—CR^{1'}{}_2—SiR'_bY_{3-b} \qquad (II)$$

and/or partial hydrolyzates thereof, where

X is a monovalent organic radical bonded to $—CR^{1'}{}_2—$ via nitrogen, phosphorus, oxygen, sulfur or a carbonyl group, $R^{1'}$ each independently is as defined for $R^1$, R' each independently is as defined for R, Y each independently is a hydrolyzable radical, and b is 0, 1 or 2, wherein the pH of the mixture of components (B), (C), and (D) is less than or equal to 7.

2. The composition of claim 1, wherein x is 1, 2, or 3 and a is 0 or 1.

3. The composition of claim 1, wherein the $R^1$ radicals are hydrogen atoms or hydrocarbon radicals having from 1 to 20 carbon atoms.

4. The composition of claim 1, wherein the A radical comprises an organic polymer radical.

5. The composition of claim 4, wherein the organic polymer radical comprises one or more of polyoxyalkylenes, hydrocarbon polymers, polychloroprenes, polyurethanes, polyesters, polyamides, polyacrylates, polymethacrylates, vinyl polymers, and polycarbonates.

6. The composition of claim 5, wherein the polymer radicals are bonded to $[CR^1{}_2\!-\!SiR_a(OR^2)_{3-a}]_x$ by a linkage selected from the group consisting of
—O—C(=O)—NH—, —NH—C(=O)O—, —NH—C(=O)—NH—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR"—, —P(=O)(OR")$_2$—, —O—CH$_2$—C(OH)H—CH$_2$—NR"—, —O—CH$_2$—C(OH)H—CH$_2$—S—, —O—CH$_2$—C(OH)H—CH$_2$—C(=O)—, —O—CH$_2$—C(OH)H—CH$_2$—O—,

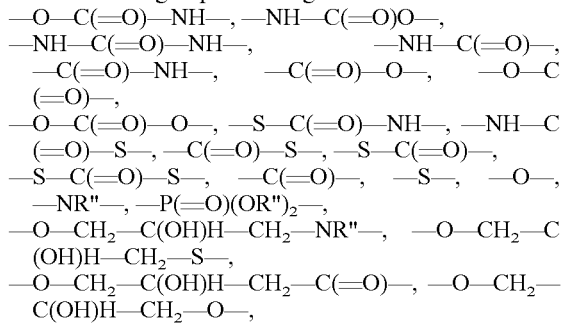

where R" may be the same or different and is a hydrogen atom or is as defined for R.

7. The composition of claim 1, wherein the compounds (A) of the formula (I) have a number average molecular weight of from 2000 g/mol to 100,000 g/mol.

8. The composition of claim 1, wherein the mixture of components (B), (C) and (D) has a pH of 4 to 7.

9. The composition of claim 1, wherein component (B1) includes at least one compound selected from the group consisting of compounds (B11) of the formula $$NR^{11}{}_3 \quad (VIII)$$

where each $R^{11}$ may be the same or different and is a hydrogen atom or hydrocarbon radical optionally substituted by hydroxyl groups, halogen atoms, amino groups, ether groups, ester groups, epoxy groups, mercapto groups, cyano groups or (poly)glycol radicals, where the latter are formed from oxyethylene and/or oxypropylene units, with the proviso that, in formula (VIII), at most two $R^{11}$ are defined as a hydrogen atom, and aliphatic cyclic amines; organosilicon compounds (B12) having at least one organic radical comprising basic nitrogen, comprising units of the formula $$R^{12}{}_k D_l Si(OR^{13})_m O_{(4-k-l-m)/2} \quad (IX)$$

in which
$R^{12}$ each may be the same or different and is a monovalent, optionally substituted SiC-bonded organic radical free of basic nitrogen,
$R^{13}$ each may be the same or different and is a hydrogen atom or optionally substituted hydrocarbon radical,
D each may be the same or different and is a monovalent, Si-bonded radical with basic nitrogen,
k is 0, 1, 2, or 3,
l is 0, 1, 2, 3 or 4 and
m is 0, 1, 2 or 3,
with the proviso that the sum of k+l+m is less than or equal to 4 and at least one D radical is present per molecule, and;
compounds (B13) of the formula $$(R^{14}{}_2N)_2\!-\!C\!=\!NR^{15} \quad (X)$$

where $R^{14}$ each may be the same or different and is a hydrogen atom or hydrocarbon radical optionally substituted by hydroxyl groups, halogen atoms, amino groups, ether groups, ester groups, epoxy groups, mercapto groups, imine groups, imide groups or (poly)glycol radicals, where the latter are formed from oxyethylene and/or oxypropylene units, and
$R^{15}$ each independently is a hydrogen atom or optionally substituted hydrocarbon radical.

10. A moisture-free, moisture curable, single component, room temperature vulcanizable composition which cures to an elastomer in the presence of water, comprising
(A) at least one compound of the formula $$A\text{-}[CR^1{}_2\!-\!SiR_a(OR^2)_{3-a}]_x \quad (I),$$

where
A is an x-valent organic radical bonded to —CR$^1{}_2$— via nitrogen, phosphorus, oxygen, sulfur or a carbonyl group,
R each independently is a monovalent, optionally substituted hydrocarbon radical,
$R^1$ each independently is hydrogen or a monovalent, optionally substituted hydrocarbon radical,
$R^2$ each independently is a monovalent, optionally substituted hydrocarbon radical,
x is an integer from 1 to 10,
a is 0, 1 or 2,
(B) at least one compound which contains at least one basic element of main group 5, selected from the group consisting of
(B2) compounds comprising basic phosphorus,
(C) at least one acid selected from the group consisting of
(C1) phosphorus acids of the formula $$O\!=\!PR^{20}{}_q(OH)_r(OR^{21})_{3-q-r} \quad (III)$$

and/or condensates thereof with one or more P—O—P bonds and
(C2) carboxylic acids of the formula $$HOC(=O)R^{22} \quad (IV),$$

where
$R^{20}$ each independently is an optionally substituted hydrocarbon radical which may be interrupted by oxygen atoms,
$R^{21}$ each independently is a hydrogen atom or an optionally substituted hydrocarbon radical which may be interrupted by oxygen atoms,
$R^{22}$ each independently is an optionally substituted hydrocarbon radical which may be interrupted by oxygen atoms,
q is 0, 1 or 2,
r is 1, 2 or 3 and
q+r is 1, 2 or 3, and
(D) at least one silane of the formula $$X\!-\!CR^{1'}{}_2\!-\!SiR'_b Y_{3-b} \quad (II)$$

and/or partial hydrolyzates thereof, where
X is a monovalent organic radical bonded to —CR$^{1'}{}_2$— via nitrogen, phosphorus, oxygen, sulfur or a carbonyl group,
$R^{1'}$ each independently is as defined for $R^1$,
R' each independently is as defined for R,
Y each independently is a hydrolyzable radical, and
b is 0, 1 or 2,
wherein the pH of the crosslinkable composition is less than or equal to 7, and
wherein the compounds (B2) comprising basic phosphorus are those of the formula $$[R^{16}{}_4P^+]_s Z^{s-} \quad (XI)$$

where
s is 1, 2 or 3,
$R^{16}$ each may be the same or different and is an optionally substituted hydrocarbon radical having from 1 to 40 carbon atoms, and
Z is a group of the formula $$O=PR^{17}{}_n(O-)_m(OR^{18})_{3-n-m} \quad (XII)$$

and/or condensate thereof with one or more P—O—P bonds;
or a group of the formula $$^-OC(=O)R^{19} \quad (XIII)$$

where
$R^{17}$ each may be the same or different and is an optionally substituted hydrocarbon radical which may be interrupted by oxygen atoms,
$R^{18}$ each may be the same or different and is a hydrogen atom or optionally substituted hydrocarbon radical which may be interrupted by oxygen atoms,
$R^{19}$ each may be the same or different and is an optionally substituted hydrocarbon radical which may be interrupted by oxygen atoms,
n is 0, 1 or 2,
m is 1, 2 or 3 and
m+n is 1, 2 or 3.

11. The composition of claim 1, which comprises:
(A) compounds of the formula (I),
(B) at least one organic base of the formulae (VIII), (IX), (X), and (XI),
wherein formula (VIII) is $$NR^{11}{}_3 \quad (VIII)$$

where each $R^{11}$ may be the same or different and is a hydrogen atom or hydrocarbon radical optionally substituted by hydroxyl groups, halogen atoms, amino groups, ether groups, ester groups, epoxy groups, mercapto groups, cyano groups or (poly)glycol radicals, where the latter are formed from oxyethylene and/or oxypropylene units,
with the proviso that, in formula (VIII), at most two $R^{11}$ are defined as a hydrogen atom, and aliphatic cyclic amines;
wherein formula (IX) is $$R^{12}{}_k D_l Si(OR^{13})_m O_{(4-k-l-m)/2} \quad (IX)$$

in which
$R^{12}$ each may be the same or different and is a monovalent, optionally substituted SiC-bonded organic radical free of basic nitrogen,
$R^{13}$ each may be the same or different and is a hydrogen atom or optionally substituted hydrocarbon radical,
D each may be the same or different and is a monovalent, Si-bonded radical with basic nitrogen,
k is 0, 1, 2, or 3,
l is 0, 1, 2, 3 or 4 and
m is 0, 1, 2 or 3,
with the proviso that the sum of k+l+m is less than or equal to 4 and at least one D radical is present per molecule;

wherein formula (X) is $$(R^{14}{}_2N)_2-C=NR^{15} \quad (X)$$

where $R^{14}$ each may be the same or different and is a hydrogen atom or hydrocarbon radical optionally substituted by hydroxyl groups, halogen atoms, amino groups, ether groups, ester groups, epoxy groups, mercapto groups, imine groups, imide groups or (poly)glycol radicals, where the latter are formed from oxyethylene and/or oxypropylene units, and
$R^{15}$ each independently is a hydrogen atom or optionally substituted hydrocarbon radical; and
wherein (XI) is $$[R^{16}{}_4P^+]_s Z^{s-} \quad (XI)$$

where
s is 1, 2 or 3,
$R^{16}$ each may be the same or different and is an optionally substituted hydrocarbon radical having from 1 to 40 carbon atoms, and
(C) organic acids of the formula (III) and/or (IV),
(D) silanes of the formula (II),
and optionally, one or more of
(E) crosslinkers,
(F) plasticizers,
(G) fillers,
(H) adhesion promoters, and
(I) additives selected from the group consisting of antioxidants, UV absorbers and sterically hindered amines.

12. A process for preparing the composition of claim 1, wherein all constituents are mixed with one another in any sequence.

13. A molding produced by crosslinking a composition of claim 1.

14. The composition of claim 1, wherein the mixture of components (B), (C) and (D) has a pH of 5 to 7.

15. The moisture curable composition of claim 1, containing at least one basic nitrogen compound (B1) selected from the group consisting of aminopropyltrimethoxysilane, aminopropyltriethoxysilane, 3-aminoethylaminopropyl-trimethoxysilane, 1,3-diphenylguanidine, 1,3-di-o-tolylguanidine, 1,3-diisopropylguanidine, 1,3-dimethylguanidine, dicyandiamide, 1,1,3,3-tetramethylguanidine, (1,1,3,3-tetramethylguanidyl)propyltrimethoxysilane, 1-o-tolylbiguanidine, and 1,1,5,5-tetramethylbiguanidine.

16. The moisture curable composition of claim 1, containing at least one basic nitrogen compound (B1) selected from the group consisting of 1,3-diphenylguanidine, 1,3-di-o-tolylguanidine, 1,3-diisopropylguanidine, 1,3-dimethylguanidine, dicyandiamide, 1,1,3,3-tetramethylguanidine, (1,1,3,3-tetramethylguanidyl)propyltrimethoxysilane, 1-o-tolylbiguanidine, and 1,1,5,5-tetramethylbiguanidine.

17. The moisture curable composition of claim 14, wherein acid (C) is a carboxylic acid (C2).

18. The moisture curable composition of claim 2, wherein acid (C) is a phosphorus acid (C1).

* * * * *